(12) United States Patent
Cook et al.

(10) Patent No.: US 9,965,255 B2
(45) Date of Patent: May 8, 2018

(54) CODE ORIGINATION DATA MANAGEMENT FOR CODE ASSEMBLY

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 15/209,838

(22) Filed: Jul. 14, 2016

(65) Prior Publication Data

US 2018/0018149 A1 Jan. 18, 2018

(51) Int. Cl.
*G06F 9/44* (2006.01)

(52) U.S. Cl.
CPC ..................... *G06F 8/35* (2013.01)

(58) Field of Classification Search
CPC ................ G06F 8/10; G06F 8/20; G06F 8/24
USPC ........................................................ 717/104
See application file for complete search history.

(56) References Cited

U.S. PATENT DOCUMENTS

| 8,762,946 | B2 | 6/2014 | Howard | |
|---|---|---|---|---|
| 8,914,780 | B2 * | 12/2014 | Ibarra | G06F 8/71 717/145 |
| 8,930,888 | B2 * | 1/2015 | Canches | G06F 8/315 705/22 |
| 9,110,681 | B2 | 8/2015 | Branson et al. | |
| 9,158,795 | B2 * | 10/2015 | Branson | G06F 17/30516 |
| 2003/0004882 | A1 * | 1/2003 | Holler | G06F 8/65 705/51 |
| 2008/0250390 | A1 * | 10/2008 | Feblowitz | G06F 8/34 717/114 |
| 2012/0227034 | A1 * | 9/2012 | Ibarra | G06F 8/71 717/145 |
| 2014/0282403 | A1 * | 9/2014 | Frenkiel | G06F 8/73 717/123 |

OTHER PUBLICATIONS

Baude et al., "Interactive and Descriptor-Based Deployment of Object-Oriented Grid Applications," HPDC-11 2002, IEEE, 2002.
Goldsack et al., "SmartFrog: Configuration and Automatic Ignition of Distributed Applications," HP OVUA 2003, HP, May 29, 2003.
(Continued)

*Primary Examiner* — John Chavis
(74) *Attorney, Agent, or Firm* — Jared L. Montanaro

(57) ABSTRACT

Aspects of the disclosure relate to managing code origination data for a stream computing environment. A first set of code origination data which corresponds to a first computing object and a second set of code origination data which corresponds to a second computing object may be detected for utilization to develop a streaming application in the stream computing environment. Based on the first and second sets of code origination data, a code assembly arrangement with respect to the first and second computing objects may be determined. The code assembly arrangement may be established with respect to the first and second computing objects to develop the streaming application.

19 Claims, 10 Drawing Sheets

(56) References Cited

OTHER PUBLICATIONS

Dearle et al., "A Flexible and Secure Deployment Framework for Distributed Applications," Component Deployment, LNCS 3083, pp. 219-233, 2004.
Allen et al., "The Grid Application Toolkit: Towards Generic and Easy Application Programming Interfaces for the Grid," Proc. of the IEEE 93.3 (2005): 534-550.
Otte et al., "Towards an Adaptive Deployment and Configuration Framework for Component-Based Distributed Systems," ARM'10, 2010.
Ravindranathan et al., "ETANA-DL: A Digital Library for Integrated Handling of Heterogeneous Archaeological Data," ACM, 2004.
List of IBM Patents or Patent Applications Treated as Related, Jul. 14, 2016, 2 pgs.
International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>, printed Mar. 6, 2016, 3 pgs.
Intel Corporation; OpenAttestation; <https://01.org/OpenAttestation>, printed Jul. 11, 2016, 5 pgs.
Cook et al., "Code Origination Data Management for Host Placement," U.S. Appl. No. 15/209,827, filed Jul. 14, 2016.

* cited by examiner

CODE ORIGINATION DATA MANAGEMENT FOR CODE ASSEMBLY

BACKGROUND

This disclosure relates generally to computer systems and, more particularly, relates to managing code origination data. The amount of data that needs to be managed by enterprises is increasing. Management of code origination data may be desired to be performed as efficiently as possible. As data needing to be managed increases, the need for management efficiency may increase.

SUMMARY

Aspects of the disclosure relate to managing components of a distributed software application differently based on where the components originate. Host computing devices may be determined for portions of the distributed software application based on the source of included software components. Host placement arrangements for components of the distributed software application may be determined based on metadata that indicates information regarding the development origin, author, stability, creation date, code repository branch, and other characteristics of the components. Code assembly for the distributed software application may be performed based on the origination data for the software components. Operator fusion, code processing, exception handling, operator assignment, and other code assembly decisions may be made based on the source information for the software components. Leveraging origination data for software components may facilitate application deployment and code assembly for the distributed software application.

Aspects of the disclosure relate to managing code origination data for a stream computing environment. A first set of code origination data which corresponds to a first computing object and a second set of code origination data which corresponds to a second computing object may be detected for utilization to develop a streaming application in the stream computing environment. Based on the first and second sets of code origination data, a code assembly arrangement with respect to the first and second computing objects may be determined. The code assembly arrangement may be established with respect to the first and second computing objects to develop the streaming application.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
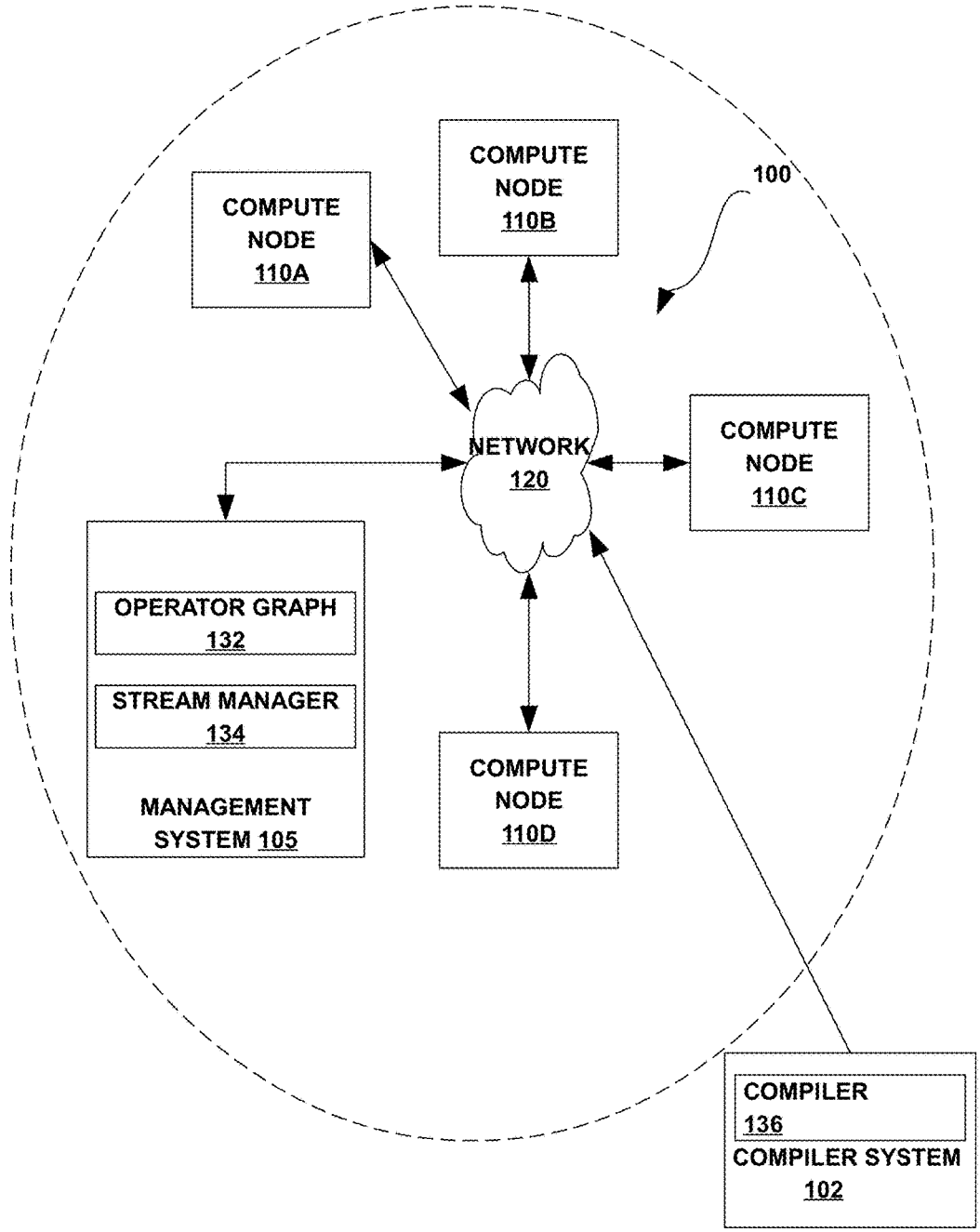
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing coding objects of a distributed software application differently based on where the coding objects originate. Host compute nodes may be determined for portions of the distributed software application based on the origination location of individual coding objects. In embodiments, aspects of the disclosure relate to attaching metadata to a coding object that indicates the origin location of the coding object. Based on the origination location of the coding object, an appropriate host compute node may be determined to receive deployment of the coding object. For instance, coding objects from trusted sources (e.g., in-house development teams) may be placed on compute nodes that have strict data security requirements (e.g., to maintain data security), while code toolkits downloaded from web-based toolkit repositories such as GitHub (trademark of GitHub, LLC) that can have unknown origination locations may be restricted to placement on host compute nodes that do not contain sensitive data.

Aspects of the disclosure relate to managing code assembly for a distributed software application based on the origination location of the coding objects. The software applications, streaming operators, and other computing resources that may be used in association with the coding objects may be determined based on the source (e.g., developer) of the coding objects. In embodiments, metadata that indicates the origination location of a particular coding object may be detected and used to determine an appropriate code assembly arrangement for the coding object. For instance, operator fusion, code processing, exception handling, operator assignment (e.g., to a consistent region), and other code assembly decisions may be made based on the detected origination location metadata. Leveraging origination data for the coding objects may facilitate application deployment (e.g., to host computing devices) and code assembly for the distributed software application.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. In some cases a particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, map, list, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple. Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure relate to managing code origination data for a distributed computing environment having a set of compute nodes which includes a first compute node. A first set of code origination data which corresponds to a first computing object may be detected. The first set of code origination data may be utilized to develop a distributed application in the distributed computing environment. The first set of code origination data may indicate a trust factor for the first computing object. A first compute node to host the first computing object for the distributed application may be identified using the first set of code origination data. The first computing object may be deployed to the first compute node to develop the distributed application.

Aspects of the disclosure relate to managing code origination data for a stream computing environment. A first set of code origination data which corresponds to a first computing object and a second set of code origination data which corresponds to a second computing object may be detected for utilization to develop a streaming application in the stream computing environment. The first set of code origination data may indicate a first trust factor for the first computing object, and the second set of code origination data may indicate a second trust factor for the second computing object. Based on the first and second sets of code origination data, a code assembly arrangement may be determined with respect to the first and second computing objects. The code assembly arrangement may be established with respect to the first and second computing objects to develop the streaming application.

In embodiments, as described herein, application deployment and code assembly decisions may be based on code origination data. Metadata that indicates information regarding the development origin, author, stability (e.g., volatile vs. non-volatile), creation date, code repository branch, and other characteristics of the software components may be used to manage how the individual software components are deployed on compute devices, and also how code assembly for the distributed software application is performed. As described herein, performance or efficiency benefits may result from managing the set of origination data (e.g., data security, application stability, speed, flexibility, load balancing, responsiveness, resource usage, productivity). Aspects may save resources such as bandwidth, processing, or memory.

In embodiments, aspects of the disclosure relate to performing one or more of the steps described herein in a distributed computing environment. Generally, the distributed computing environment may include a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. The distributed computing environment may include one or more of a private cloud, community cloud, public cloud, hybrid cloud, or other deployment model configured to provide software, digital platform, or infrastructure based services. In embodiments, the distributed computing method may be associated with characteristics including on-demand self-service, broad network access, resource pooling, rapid elasticity, measured service and the like. In embodiments, the distributed computing environment may include one or more computing nodes configured to implement various aspects of the method described herein for warning data management. Other types of distributed computing environments are also possible.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
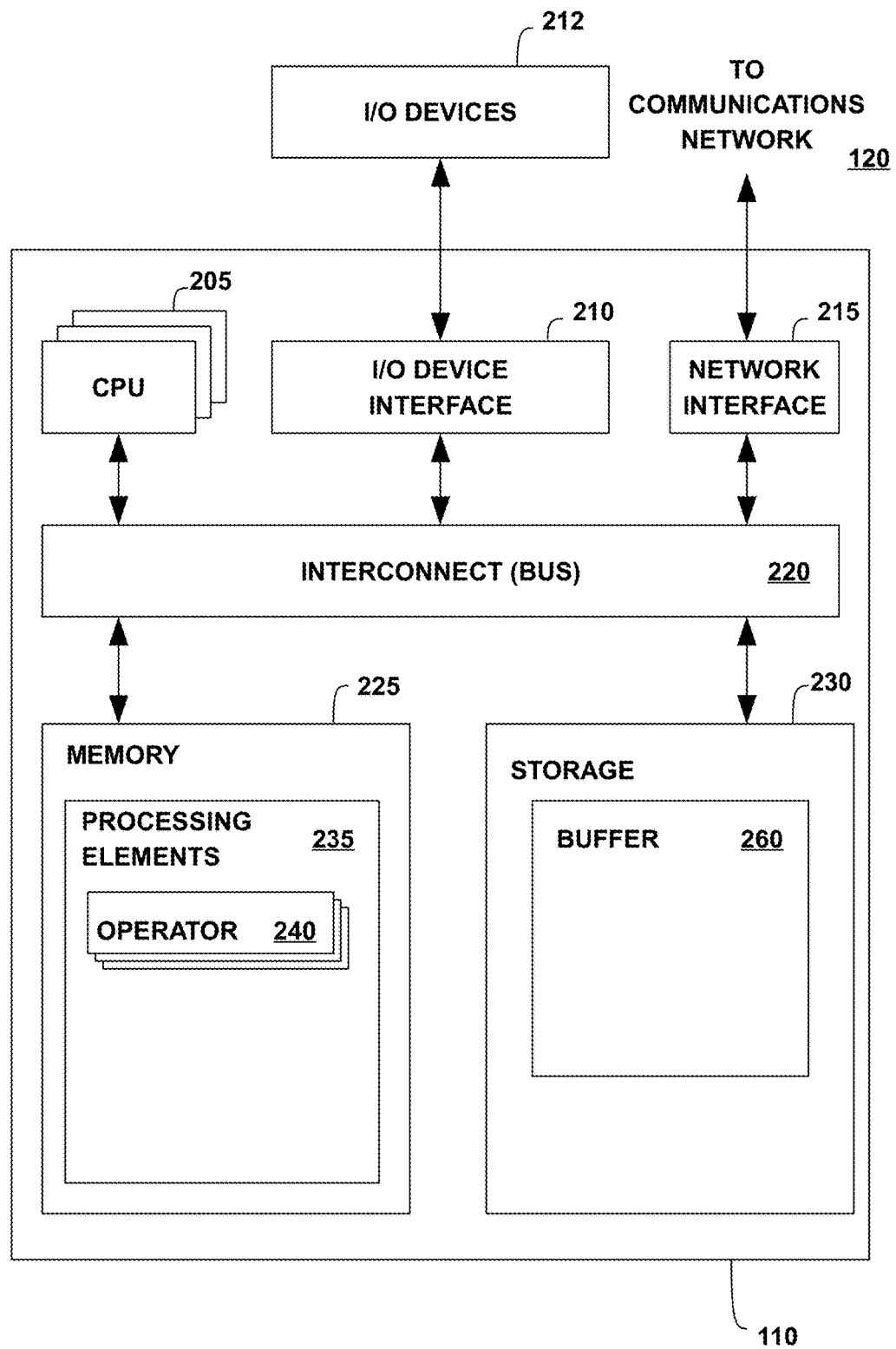
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
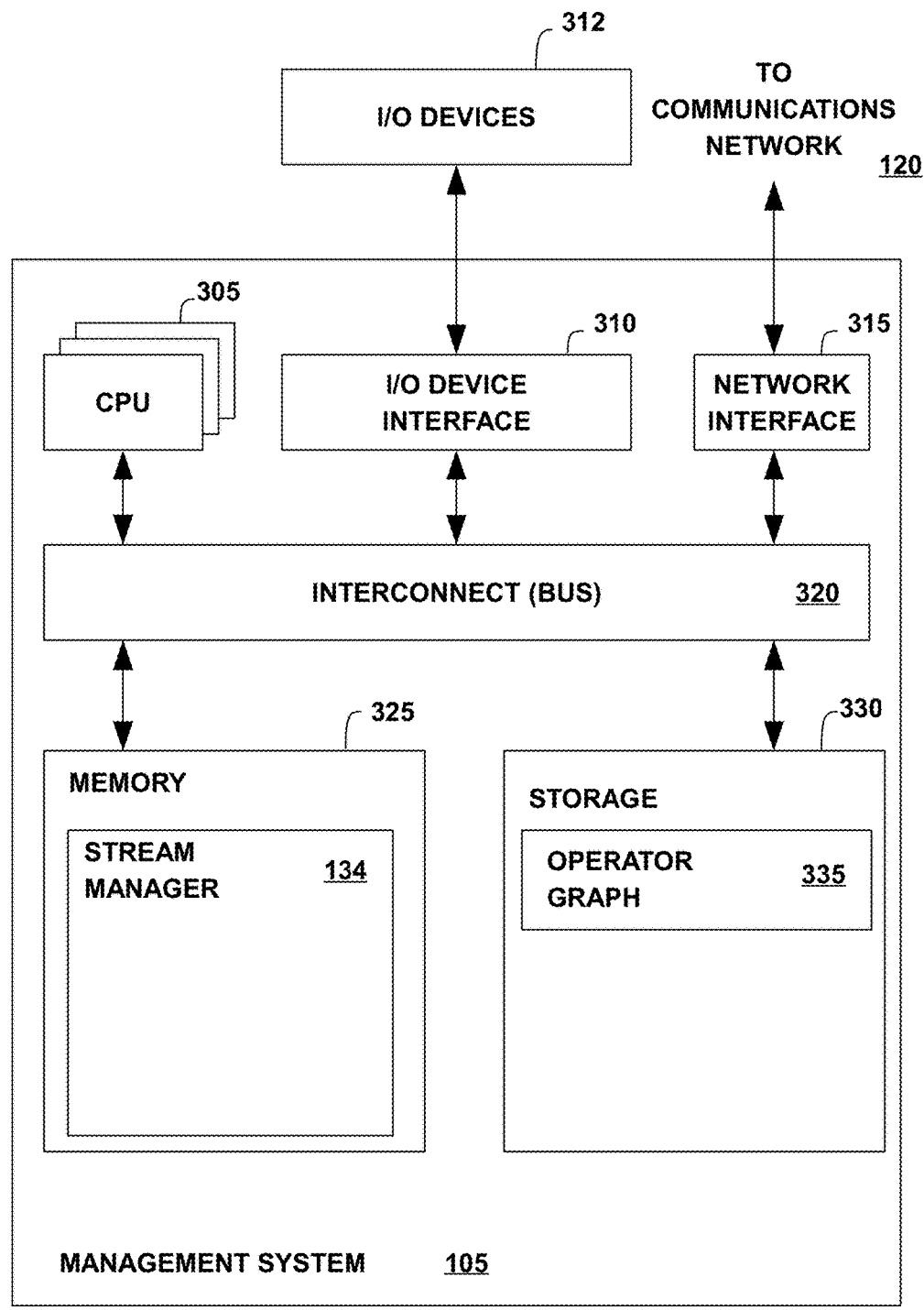
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
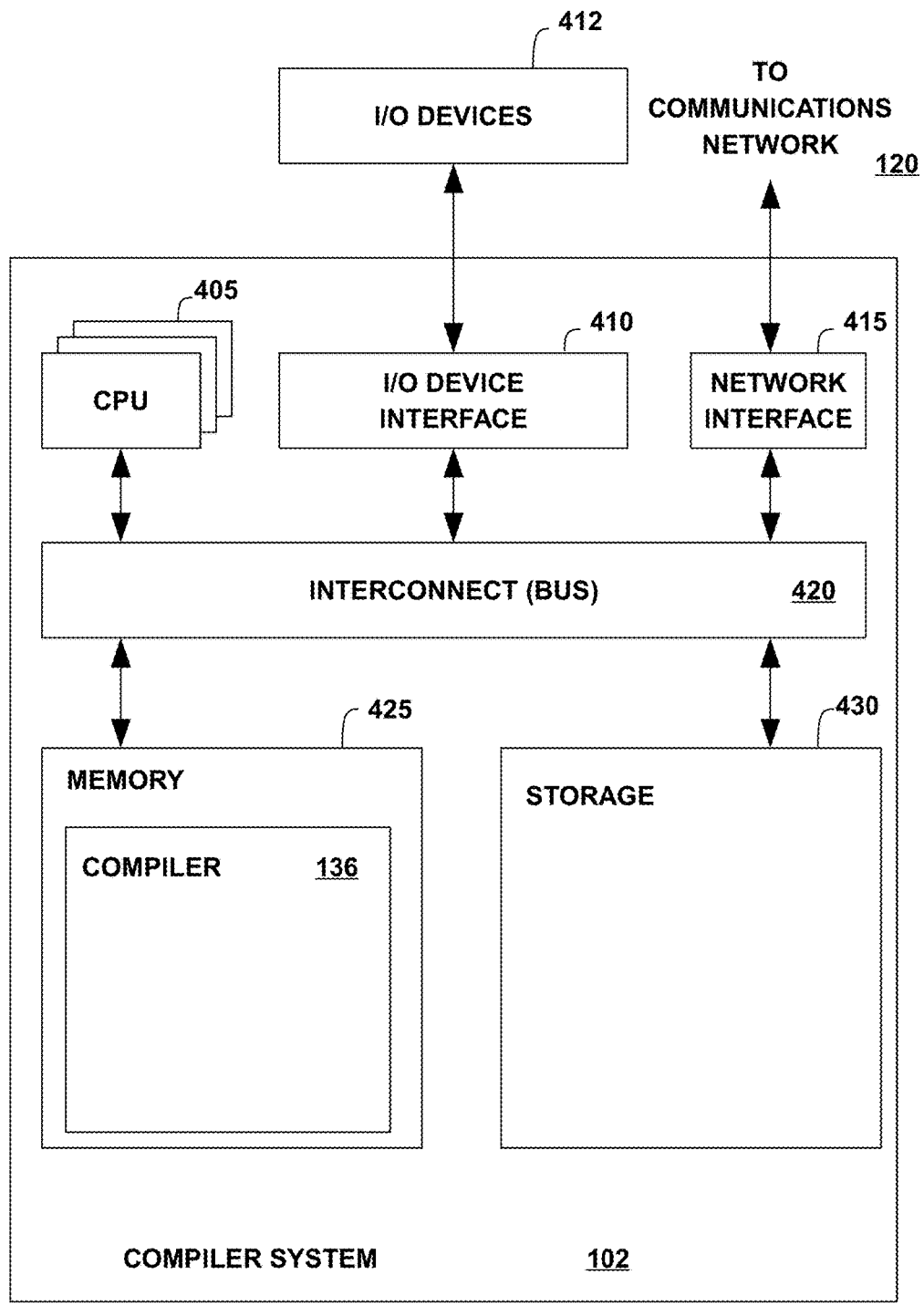
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In embodiments, a streams application bundle or streams application bundle file may be created. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute processes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
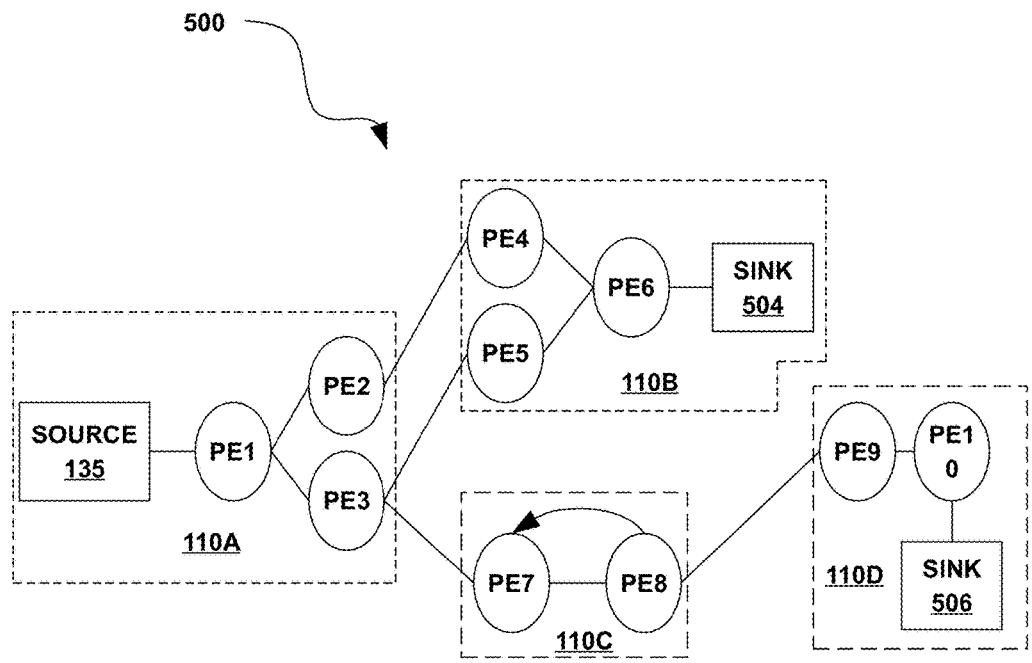
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
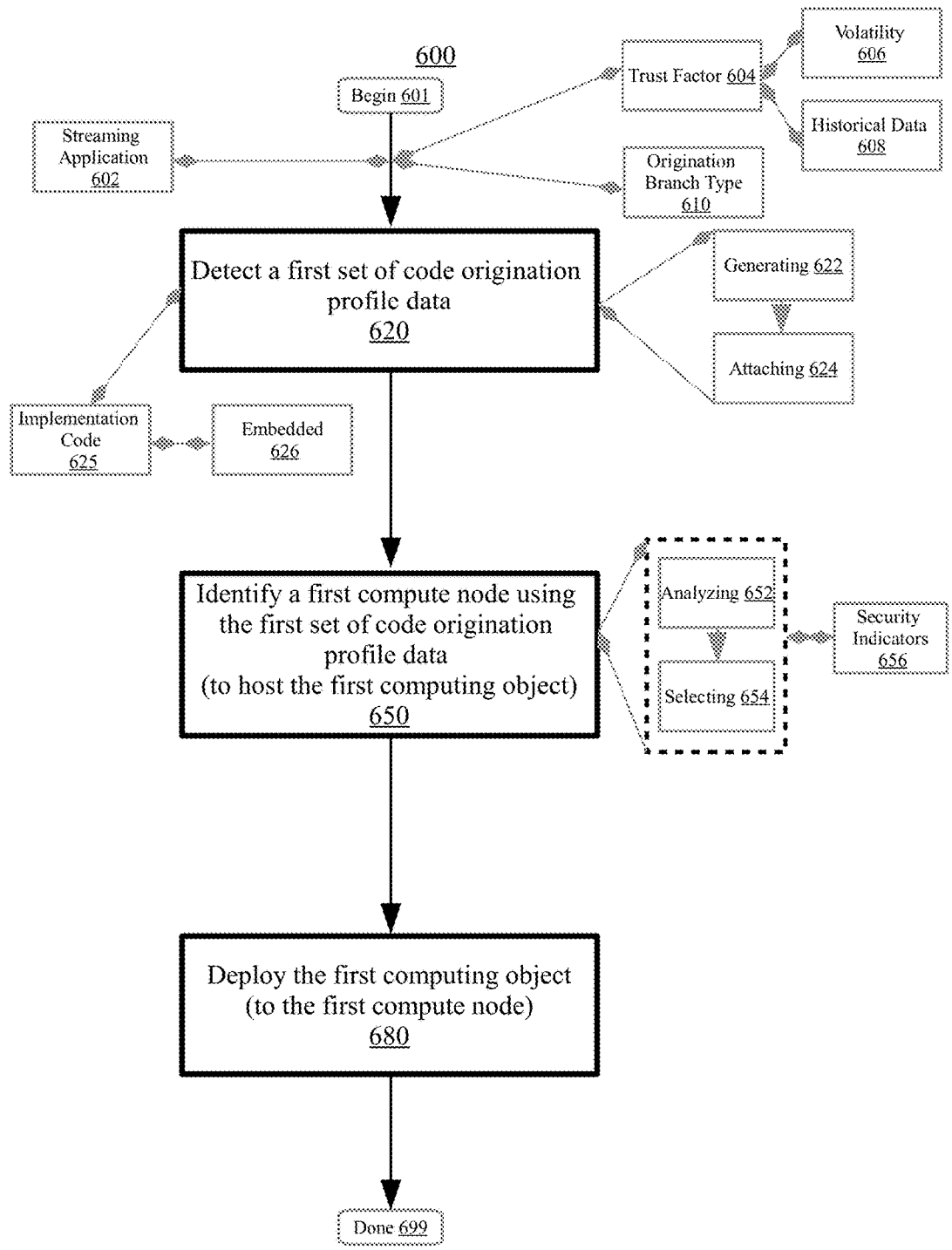
FIG. 6 is a flowchart illustrating a method for managing code origination data for a distributed computing environment having a set of compute nodes which include a first compute node, according to embodiments.

FIG. 6 is a flowchart illustrating a method 600 for managing code origination data for a distributed computing environment having a set of compute nodes which include a first compute node, according to embodiments. Aspects of FIG. 6 relate to deploying a first computing object (e.g., coding object) to the first compute node based on a detected set of code origination data for the computing object. Generally, the set of code origination data can include information such as metadata or a digital signature that indicates or identifies a source (e.g., author, distributor) or origination location (e.g., in-house code development, third party code repository) of the first computing object. The set of code origination data may be used to identify a compute node from among the set of compute nodes to host the first computing object. The set of compute nodes may include a shared pool of configurable computing resources configured to operate in a public cloud environment, a private cloud environment, a hybrid cloud environment, or other distributed computing environment. In certain embodiments, each of the set of compute nodes may be physically separate from one another. Leveraging the set of code origination data may facilitate management of computing resources and be associated with performance or efficiency benefits (e.g., resource availability, network stability, computing resource efficiency) with respect to the distributed computing network. The method 600 may begin at block 601.

In embodiments, aspects of the disclosure relate to development of a distributed application including a streaming application at block 602. Generally, the streaming application can include a software program, digital package, executable file, or other set of computer instructions configured to process streams of data (e.g., tuples) in a distributed computing environment. Software components of the streaming application may be configured for dynamic delivery to one or more host compute nodes at the time a particular software component becomes necessary (e.g., rather than requiring the software components to be pre-installed on the host compute node). In embodiments, the streaming application may include one or more computing objects including a first computing object (e.g., coding object). The computing objects may include a set, portion, or line of implementation code, a code location, code toolkit, or other aspect of the implementation code that is included in the streaming application. For example, the computing object may include a software module configured to invoke a particular operation or function within the streaming application. Other types of streaming applications and computing objects are also possible.

In embodiments, the first computing object may be associated with a first set of code origination data. Generally, the first set of code origination data can include information that identifies the source (e.g., code developer, distributor) or origination location (e.g., in-house code development, third-party code repository), or indicates other characteristics or attributes regarding the history, origin, or development of the first computing object. In embodiments, the first set of code origination data may include metadata such as data tags, comments, or other annotations that indicate the individuals, organizations, or enterprises involved in the creation or development of the first computing object. As an example, a particular computing object may be associated with a digital signature indicating that it was written by James Smith of ACME Software Corporation on Apr. 14, 2015. In embodiments, the first set of code origination data may include a history of the organizations that a particular computing object was handled by up to the present time. For instance, a code toolkit may be associated with a set of code origination data that indicates that it was created by the ACME Software Corporation In-House Streaming Application Development Group, uploaded to a third-party code repository SoftwareHub, and then downloaded and modified by Hilldale Institute of Technology. Other types of code origination data are also possible.

In embodiments, the first set of code origination data may indicate a trust factor for the first computing object at block 604. Generally, the trust factor can include a quantitative or qualitative measure, representation, expression, or indication of the reliability, safety, dependability, or security of the first computing object. In embodiments, aspects of the disclosure relate to the recognition that the reliability or safety (e.g., trustworthiness) of a particular computing object may be based on the individual or organization that developed it. As such, an originator/source of a certain computing object can indicate (e.g., be mapped-to) a certain trust factor for the certain computing object. For instance, in-house developed computing objects may be considered more trustworthy than computing objects acquired from third-party software repositories (e.g., toolkits). Accordingly, aspects of the disclosure relate to assigning a trust factor to the first computing object to indicate the security, safety, credibility, or reliability of the first computing object. In embodiments, the trust factor may be computed based on the code origination data, volatility (e.g., stability), historical data (e.g., error reports, usage records) for the first computing object. As described herein, in certain embodiments, a host compute node for the first computing object may be identified based on the trust factor. Other types of trust factors are also possible.

In embodiments, the trust factor may be based on the volatility of the first computing object at block 606. Generally, volatility can include an indication of the instability, unpredictability, or proclivity of a particular computing object to malfunction. In embodiments, volatile computing objects may be associated with a greater likelihood of failure, bugs, or other irregularities. In embodiments, volatility may include a measure of the frequency with which a particular computing object (e.g., the first computing object) changes. Changes to the computing object may be voluntary edits or revisions made to the source code by a developer or administrator, automatic changes made by another software application, or inadvertent changes caused as the result of a code defect or other error (e.g., poor cohesion, dependency structure, or abstraction).

In embodiments, the volatility of the first computing object may be measured and expressed in a quantitative form (e.g., number of changes per time period). For instance, a software application that is undergoing development may be frequently revised and edited, resulting in a relatively high volatility measurement (e.g., 200 commit operations in a one day period). In embodiments, changes to a software application in the form of patches or updates may also be considered part of the volatility measurement for the computing object. As another example, a computing object that is associated with malfunctions in past usage instances (e.g., code frequency fails upon invocation) may also be associated with a relatively high volatility measurement. In embodiments, the volatility of the first computing object may be expressed as a percentage that indicates the likelihood of the first computing object encountering an error event or irregularity during execution (e.g., based on historical usage data). The greater the volatility measure for a particular computing object is, the more likely it is that changes to that software component will result in a code defect. Accordingly, as described herein, computing objects having low volatility may be associated with relatively high trust factors. Other methods of evaluating and utilizing volatility for a computing object are also possible.

In embodiments, the first set of code origination data may indicate an origination branch of the first computing object at block 610. Generally, the origination branch may include an indication of the specific branch (e.g., segment or division of code) of the code repository that the first computing object is associated with. In embodiments, the origination branch may be classified using one or more branch types that represent the stage of development of the first computing object. For instance, in embodiments, the origination branch type may include a stable type, an unstable type, a testing type, an incubation type, a graduated type, an integrated type, a mature type, or a deprecated type. The stable type may indicate that the first computing object has low volatility (e.g., infrequent error instances, low frequency of changes/modifications), low error event rates, and operates correctly. In embodiments, the unstable type may indicate that the first computing object has relatively high volatility (e.g., frequent error events), frequent error events, doesn't operate correctly, or is associated with other issues or irregularities. The testing type may indicate that the first computing object is undergoing performance tests, evaluations, or other assessments, and may not be finalized. In embodiments, the incubation type may indicate that the first computing object is in an early stage of development, and remains substantially far from completion (e.g., unfinished source code, not compiled). The graduated type may indicate that the first computing object is in an intermediate stage of development, and that one or more significant operations remain before the first computing object is completed (e.g., not yet bug-tested, performance evaluations not performed). In embodiments, the integrated type may indicate that the first computing object is incorporated along with other code, certain operators are called or referenced by other code modules, or that one or more aspects of the first computing object are being utilized by external scripts or procedures. The mature type may indicate that the first computing object is substantially complete, has been utilized for an extended period of time (e.g., 6 months, 1 year), or has low volatility (e.g., low frequency of errors/changes). In embodiments, the deprecated type may indicate that the first computing object is associated with a bug/error, performance issue, or other irregularity. Other types of origination branch type beyond those described explicitly herein are also possible.

In embodiments, the trust factor may be based on historical data for the first computing object at block 608. Generally, historical data can include information regarding how, where, and in what way the first computing object has been utilized in past software applications. For instance, the historical data may include performance history, usage records, test results, and other archived data regarding the usage history of the first computing object. In embodiments, the historical data may include performance metrics indicating how the first computing object has performed in past software applications (e.g., number of times the first computing object was called/executed, whether or not errors were encountered), as well as information regarding the configuration of the computing environment in which the first computing object was utilized (e.g., type of application, system resources allocated for use by the first computing object, workload handled by the first computing object). As an example, the historical data may indicate that a particular computing object has been utilized for 9 months in a streaming application hosted by a compute node having 3 Gigahertz of processing resources, 8 Gigabytes of memory, and 2 terabytes of storage space, and 2 error events were encountered during that time. Other types of historical data for the first computing object are also possible.

In embodiments, as described herein, the trust factor may be based on the origination data, volatility, and historical data for the first computing object. In certain embodiments, the trust factor may include a trust score calculated based on the origination data, volatility, and historical data for the first computing object. The trust score may include a quantitative measure, grade, rank, representation, index, or other expression of the trust factor associated with the first computing object. In embodiments, the trust score may be calculated using an algorithm, clustering technique, or other method configured to weight the origination data, volatility, and historical data to compute a quantitative indication of the trust factor for the first computing object. In embodiments, the trust score may be expressed as an integer between 0 and 100, where greater values are associated with higher levels of trust (e.g., reliability, credibility, dependability, safety, security) and lesser values are associated with lower levels of trust. In embodiments, the trust score may be expressed using a letter grading system (e.g., A, B, C, D, F). Other methods of determining and expressing the trust score are also possible.

Consider the following example. A first computing object may be associated with code origination data that indicates that it was developed by a team of experienced software engineers at a large company, is located in a "stable" type origination branch, has low volatility, and has been used for 14 months as part of multiple streaming applications without encountering an error event (e.g., based on historical data). Accordingly, these factors may be weighted, and a trust score for the first computing object of "87" may be calculated (e.g., the first computing object is determined to be substantially safe, secure, reliable, or otherwise trustworthy). As another example, a second computing object may be associated with code origination data that indicates it is a code toolkit that was developed by an unknown individual and downloaded from a third-party code toolkit repository. The second computing object may be located in a "incubation" type origination branch, have high volatility (e.g., frequent errors/changes), and have an unknown usage history. In embodiments, these factors may be weighted, and a trust score for the second computing object of "17" may be calculated. Other methods of calculating and assigning the trust score are also possible.

At block 620, a first set of code origination data may be detected for utilization to develop a distributed application in the distributed computing environment. The first set of code origination data may correspond to a first computing object. Generally, detecting can include monitoring, recognizing, discerning, or otherwise discovering the first set of code origination data. As described herein, the set of code origination data can include information (e.g., metadata tags, digital signatures, comments) that identifies the source (e.g., code developer, distributor) or origination location (e.g., in-house code development, third-party code repository), or indicates other characteristics or attributes regarding the history, origin, or development of the first computing object of the first computing object. In embodiments, detecting the first set of code origination data may include analyzing a computing object (e.g., portion of source code) and ascertaining that the computing object is associated with the first set of code origination data. For instance, in embodiments, detecting may include utilizing a code diagnostic tool (e.g., static code analyzer) to scan a source code file and identify a metadata tag that indicates the origin location (e.g., developer) of one or more computing objects included in the source code file. Other methods of detecting the first set of code origination data are also possible.

Consider the following example. In certain embodiments, the first set of code origination data may include a textual comment placed in a header of a source code file. The textual comment may include information that identifies the individuals or organizations that developed the source code, as well as data regarding the usage history of the source code. As described herein, a code diagnostic tool may be used to parse the source code, and identify the textual comment in the header as the first set of code origination data. In embodiments, the textual comment may include remarks such as "Certified Product Code," "Developed by High Tech Solutions San Jose In-house Senior Engineering Team," "Low Volatility," and "4th year in service." Other methods of detecting the first set of code origination data are also possible.

In embodiments, the first set of code origination data may be generated for the first computing object at block 622. Aspects of the disclosure, in embodiments, relate to the recognition that the first computing object may include a toolkit downloaded from a toolkit repository. The toolkit repository may include a web-based code repository service where individuals and organizations may post software toolkits, code modules, and other open source computing tools. In embodiments, information such as the development location, performance characteristics, usage history, and other attributes of the toolkit may be unknown or unverified (e.g., leading to concerns regarding the reliability, security, safety, or trustworthiness of the toolkit). Accordingly, aspects of the disclosure relate to generating a first set of code origination data for the first computing object (e.g., downloaded toolkit.) Generally, generating can include creating, developing, formulating, or otherwise establishing the first set of code origination data. In embodiments, generating the first set of origination data may include creating a tag for the first computing object that indicates that it was downloaded from a toolkit repository. In embodiments, generating the first set of origination data may include tracking the usage and performance of the downloaded toolkit, and periodically establishing the usage and performance information with respect to the first computing object (e.g., the trust factor for a computing object may increase with positive performance, or decrease with negative performance). Other methods of generating the first set of code origination data are also possible.

In embodiments, the first set of code origination data may be attached to the first computing object at block 624. Generally, attaching can include linking, correlating, associating, packaging, relating, or joining the first set of code origination data with the first computing object. In embodiments, attaching may include inserting the first set of code origination data (e.g., generated at block 622) into the source code of the first computing object. For instance, attaching may include tagging one or more locations of the first computing object with annotations, comments, or call-out tags that indicate the author of that portion of source code, where the code was obtained from, performance/usage history, or other information. In certain embodiments, the first set of code origination data may be attached to the computing object at the time of download from a toolkit repository (e.g., indicating the time, date, and name of the repository from which the toolkit was obtained). In certain embodiments the first set of code origination data may be attached to the computing object at compilation time. For instance, source code downloaded from the toolkit repository may be compiled (e.g., converted into a computer-executable file), and the first set of code origination data may be attached to the computing object during a compile time check. Other methods of attaching the first set of code origination data to the first computing object are also possible.

In embodiments, the first computing object may include a set of implementation code at block 625. Generally, the set of implementation code can include a collection of computer instructions that is configured to execute or carry out a particular computer command, function, or operation. As described herein, in embodiments, the set of implementation code may include source code for a streaming application. As examples, the set of implementation code may include programming code for software applications configured to manage media content (e.g., video, music, images) delivery, data storage/backup, distributed computing resources, analytic services, and other computing services. In embodiments, the first set of code origination data may be embedded within the implementation code at block 626. Generally, embedding the first set of origination data may include coupling, bundling, joining, correlating, linking, or otherwise establishing the first set of origination data together with the implementation code. Embedding may include saving or maintaining the first set of code origination data in association with the implementation code such that mutual data access, retrieval, modification, and other operations may be smoothly performed. In embodiments, as described herein, the first set of code origination data may be compiled along with the implementation code as a single digital package. Other methods of embedding the first set of code origination data with the implementation code are also possible.

At block 650, the first compute node may be selected to host the first computing object for the distributed application. The first compute node may be identified to host the first computing object using the first set of code origination data. Generally, identifying can include selecting, discovering, recognizing, designating, or otherwise ascertaining the first compute node to host the first computing object. As described herein, aspects of the disclosure relate to using a trust factor indicated by the first set of code origination data to select an appropriate host compute node for the first computing object. Accordingly, identifying may include ascertaining a host that is associated with positive impacts (e.g., data security, application performance, stability) with respect to the first computing object as indicated by the first set of code origination data. In embodiments, identifying may include determining to place computing objects associated with high trust factors (e.g., obtained from trusted sources, low volatility, reliable usage history) on the same compute node (e.g., stable, secure host). In embodiments, identifying may include determining to place computing objects associated with low trust factors (e.g., obtained from unknown sources, high volatility, unstable usage history) on the same compute node (e.g., reduce damage/data loss in case of error occurrence). In embodiments, identifying can include determining a placement arrangement such that a plurality of compute nodes each host computing objects having substantially similar trust factors (e.g., trust balance for stable performance.) In embodiments, identifying may include determining to place computing objects having the same origination location/author on the same compute node (e.g., for increased compatibility). Other methods of identifying the first compute node to host the first computing object are also possible.

In embodiments, identifying the first compute node to host the first computing object may include analyzing the first set of origination data at block 652. Generally, analyzing can include examining (e.g., performing an inspection of the first set of origination data), evaluating (e.g., generating an appraisal of the first set of origination data), resolving (e.g., ascertaining an observation/conclusion/answer with respect to the first set of origination data), parsing (e.g., deciphering structured and unstructured data constructs of the first set of origination data), querying (e.g., asking a question regarding the first set of origination data), or categorizing (e.g., organizing by a feature or type of the first set of origination data). In embodiments, analyzing may include examining the first set of origination data with respect to a set of host profile data for the set of compute nodes. The set of host profile data may include information regarding the performance characteristics, usage history, system resources, allocated workloads, security features, and other properties and attributes of the set of compute nodes. Accordingly, analyzing may include comparing the first set of origination data with the set of host profile data to evaluate whether a particular compute node would be a suitable host for the first computing object (e.g., achieves hardware requirements, data security requirements, appropriate for the trust level of the computing object). Other methods of analyzing the first set of origination data are also possible.

In embodiments, the first compute node may be selected to host the first computing object at block 654. Selecting the first compute node to host the first computing object may be performed both based on and in response to analyzing the first set of code origination data. Generally, selecting can include choosing, designating, assigning, electing, or otherwise picking-out the first compute node to host the first computing object. In embodiments, as described herein, selecting may be based on analyzing the first set of code origination data. For instance, in response to analyzing and comparing the first set of origination data with the set of host profile data, it may be determined that the system configuration of the first compute node is a good fit (e.g., has positive impacts) with respect to the first computing object. As an example, in response to comparing the first set of origination data with the set of host profile data, it may be determined that the first computing object has the same origination location (e.g., High Tech Solutions San Jose In-house Senior Engineering Team) as one or more computing objects already hosted by the first compute node, and may thus be associated with a higher likelihood to be compatible and operate smoothly with the other hosted computing objects. Accordingly, the first compute node may be selected to host the first computing object. In certain embodiments, selecting the first compute node to host the first computing object may include determining that the first computing object achieves a compatibility threshold with respect to the first compute node. Other methods of selecting the first compute node to host the first computing object are also possible.

Consider the following example. A set of code origination data for a first computing object may be analyzed with respect to host profile data for a set of compute nodes. In response to analyzing the set of code origination data, it may be determined that the first computing object was downloaded from a web-based code repository, and has unknown performance and security characteristics (e.g., low trust factor). Analyzing the host profile data for the set of compute nodes may indicate that a first compute node hosts high-value client workloads and sensitive information. As such, in certain embodiments, it may be ascertained that the first computing object may not be a good fit for the first compute node (e.g., data security concerns may be associated with placement of unverified computing objects together with sensitive information). In embodiments, the host profile data may indicate that a second compute node of the set of compute nodes already hosts multiple computing objects associated with low trust scores, and does not contain any sensitive information or high-value workloads. Accordingly, in embodiments, the second compute node may be selected to host the first computing object (e.g., clustering compute objects associated with low trust scores on the same host may be associated with reduced data loss in case of an error occurrence). Other methods of analyzing and selecting a compute node to host the first computing object are also possible.

In embodiments, aspects of the disclosure relate to performing one or more operations with respect to the computing object based on the set of code origination data. For instance, in certain embodiments, additional logging and recording operations may be enabled for a particular computing object based on its code origination data (e.g., computing objects associated with high trust factors may require less logging, while computing objects with low trust factors may require more monitoring). As another example, particular computing objects (e.g., those with low trust factors) may be compiled with more debug information, while other computing objects (e.g., those with greater trust factors) may be compiled with less debug information. Other operations such as running computing objects in different virtual containers (e.g., different software versions, links to different software) are also possible. In certain embodiments, execution of certain computing objects (e.g., those with low trust factors) may be started and stopped at regular intervals to avoid problems such as memory leaks. Other methods of managing high-level execution of computing objects based on the set of code origination data are also possible.

In embodiments, the host profile data for the set of compute nodes may include a set of security indicators at block 656. The set of security indicators may correspond to the set of compute nodes. Generally, the set of security indicators can include tags, flags, comments, descriptions, markers, annotations, or other identifiers configured to represent, signify, or express a characteristic or property of the security environment of the set of compute nodes. In embodiments, the set of security indicators may include a rating or ranking of the level of security of one or more compute nodes. For instance, the security rating may be an integer value, letter, comment, or tag assigned to a compute node based on an evaluation of the network security protocols, data protection measures, vulnerability detection techniques, and other security features of the compute node. In certain embodiments, the set of security indicators may include a threshold security requirement that must be achieved by a computing object in order to be hosted by a particular compute node. For example, a first compute node may have a threshold security requirement that indicates that only computing objects having a trust score greater than 70 may be hosted by the first compute node (e.g., only trusted computing objects may be placed on certain compute nodes). Other types of security indicators are also possible.

At block 680, the first computing object may be deployed to the first compute node to develop the distributed application. Generally, deploying can include placing, distributing, transferring, installing, allocating, or otherwise establishing the first computing object on the first compute node. In embodiments, deploying may include transferring the first computing object to the first compute node, and configuring the first compute node to operate the first computing object. For instance, in certain embodiments, the memory partitions (e.g., regions of a storage device with dedicated operating systems), logical groupings (e.g., directories, databases), physical groupings (e.g., system resource allocations), current workloads (e.g., virtual machines) and other aspects of the first compute node may be modified or adjusted to facilitate operation of the first computing object. As described herein, in certain embodiments, the first computing object may be deployed to a compute node selected based on the set of code origination data for the first computing object. In embodiments, deploying can include verifying that the first computing object achieves a threshold security requirement of the first compute node (e.g., trust score above a threshold). In response to determining that the first computing object achieves the threshold security requirement of the first compute node, the first computing object may be allocated to the first computing object. Other methods of deploying the first computing object to the first compute node are also possible.

In embodiments, as described herein, aspects of the disclosure relate to making deployment decisions for the first computing object based on the set of code origination data. For instance, the compute nodes that a particular computing object is placed on and the software applications that may be used together with the particular computing object can be determined based on the origination location of the particular computing object. Consider, for instance, a situation in which a first code toolkit is downloaded from an online toolkit repository and has an unknown developer/origin location, a second code toolkit is an off-the shelf software application developed by "Software Tools, Inc" (a reputable third-party toolkit provider), and a third code toolkit is developed by an in-house software development group and has a positive performance record in a variety of software applications over an extended time period. Three candidate compute nodes may be available to host the three code toolkits. The first compute node may host high-value, sensitive client information, the second compute node may host a mix of in-house applications and off-the-shelf applications, and the third compute node may host experimental computing objects for testing purposes.

In embodiments, it may be determined to deploy the third code toolkit developed by the in-house software development group to the first compute node (e.g., in-house developed toolkits with positive performance histories may be deemed safe for managing high-value information). As the first code toolkit was downloaded from an online toolkit repository and has an unverified development location (e.g., low trust factor), it may be deployed on the third compute node for performance evaluation and other testing techniques. In embodiments, as the second code toolkit is certified by a reputable third-party toolkit provider and is considered to be stable product code, it may be deployed on the second compute node which already hosts other off-the-shelf software applications. Other methods of determining the placement arrangement for the three toolkits are also possible.

Consider the following additional example. A first computing object may be scanned by a code diagnostic tool, and a set of code origination data for the computing object may be detected. The set of code origination data may indicate that the first computing object was downloaded from a web-based toolkit repository, and is associated with a tag that states "ACME Certified Code Toolkit." The set of code origination data may also indicate that the first computing object belongs to a "graduated" type origination branch. As described herein, the set of code origination data may be evaluated and a trust score may be assigned to the first computing object. For example, a trust score of "68" may be assigned to the first computing object (e.g., the developer certification may indicate that the code is trustworthy, however the "graduated" type origination branch and acquisition from a toolkit repository may limit the reliability of the computing object). In embodiments, a set of compute nodes may include 4 compute nodes, each compute node associated with a security threshold requirement (e.g., minimum trust value necessary for deployment of a computing object to that node). For example, the first, second, third, and fourth compute nodes may be associated with security threshold requirements of 37, 64, 71, and 86, respectively. Additionally, host profile data for each compute node may be analyzed and compared with the set of code origination data. In response to analyzing and comparing the set of code origination data for the computing object with the host profile data for the set of compute nodes, it may be determined that the second compute node is currently hosting other workloads that are also associated with "ACME Certified Code Toolkit" tags. Accordingly, in embodiments, the second compute node may be determined to have positive impacts with respect to the first computing object, and the first computing object may be deployed to the second node (e.g., the first computing node's trust score of 68 achieves the second node's security threshold value of 67, and grouping computing objects with similar origin locations may be associated with stable performance).

Method 600 concludes at block 699. Aspects of method 600 may provide performance or efficiency benefits for code origination data management. For example, aspects of method 600 may have positive impacts with respect to computing resource host placement and distributed application development in a distributed computing environment. In embodiments, the detecting, identifying, and deploying described herein may each occur in an automated fashion without user intervention. Altogether, leveraging the set of code origination data may facilitate management of computing resources and be associated with performance or efficiency benefits (e.g., resource availability, network stability, computing resource efficiency) with respect to the distributed computing network.

Figure 7:
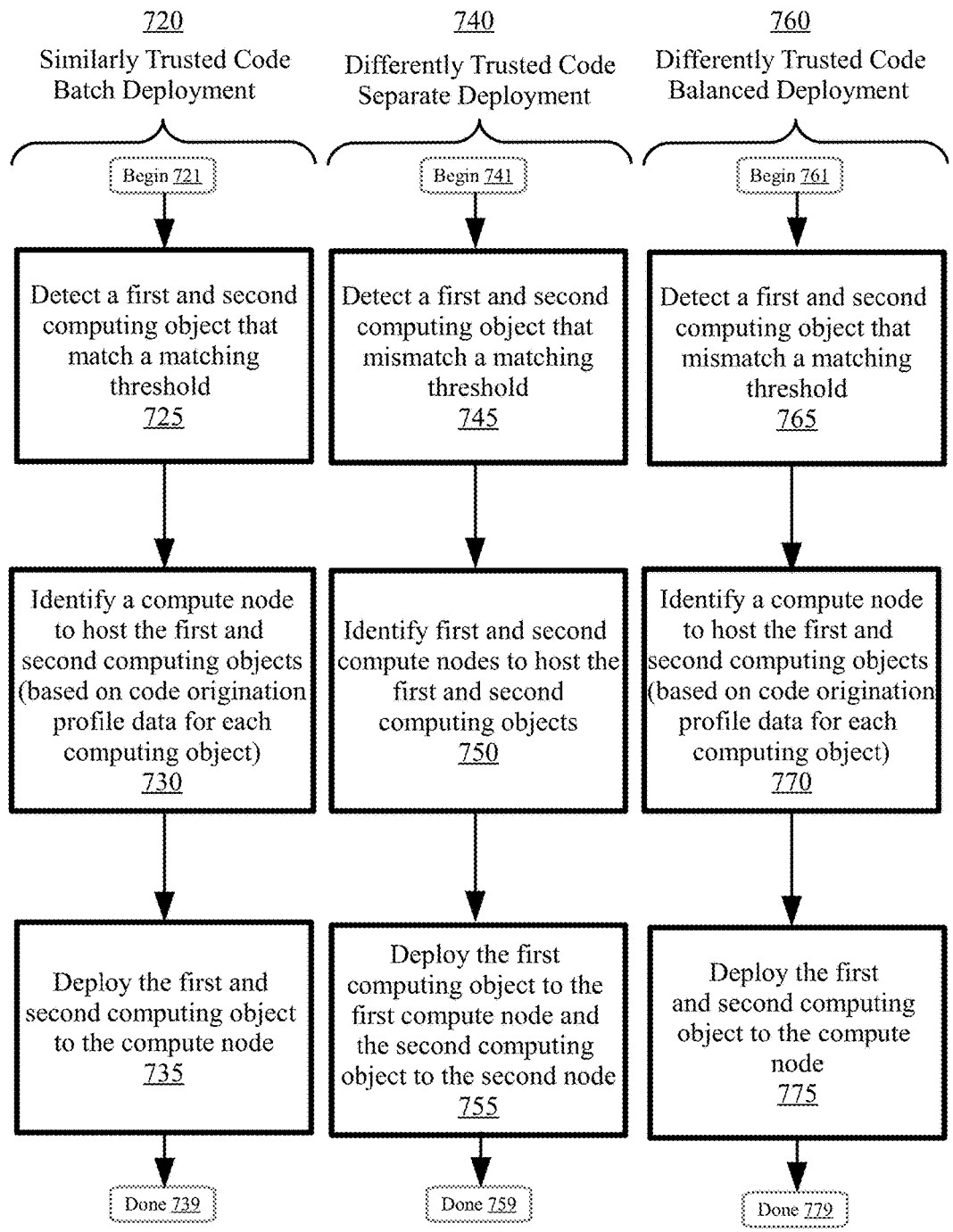
FIG. 7 is a flowchart illustrating methods for managing code origination data for a distributed computing environment having a set of compute nodes which include a first compute node, according to embodiments.

FIG. 7 is a flowchart illustrating methods 720, 740, and 760 for managing code origination data for a distributed computing environment having a set of compute nodes which include a first compute node, according to embodiments. Aspects of the disclosure relate to the recognition that different computing object/host compute node placement arrangements may be desirable based on the nature of the computing object, host compute node configuration, and code origination data for the computing object (e.g., trust factor). Accordingly, aspects of FIG. 7 relate to a method 720 for batch deployment of similarly trusted code, a method 740 for separate deployment of differently trusted code, and a method 760 for balanced deployment of differently trusted code. In embodiments, a placement arrangement for the set of compute nodes may be determined based on a matching threshold. The matching threshold may include a quantitative or qualitative criterion specifying a degree of similarity, correlation, or correspondence between the first and second computing objects. For instance, the matching threshold may specify that different computing objects that have the same origination location, similar volatility measure, similar usage periods, or other corresponding attributes achieve the matching threshold. In embodiments, the matching threshold may include a trust threshold that designates a range of trust scores (e.g., 72-80). Other types of matching threshold are also possible. Leveraging the set of code origination data may facilitate management of computing resources and be associated with performance or efficiency benefits (e.g., resource availability, network stability, computing resource efficiency) with respect to the distributed computing network.

In embodiments, aspects of method 720 relate to placing computing objects having similar trust factors on the same host compute node. For example, a plurality of computing objects that are associated with low trust factors may be placed on a compute node that does not host high-value workloads or sensitive information (e.g., to prevent data loss, file corruption or leaking of valuable information). As another example, a plurality of computing objects that are associated with high trust factors may be placed on a compute node to facilitate stable operation and data security for the workload of the compute node. Other methods of grouping similarly trusted code for deployment on the same compute node are also possible. The method 720 may being at block 721.

In embodiments, a first and second computing object that match a matching threshold (e.g., trust threshold) may be detected at block 725. Generally, detecting can include monitoring, recognizing, discovering, discerning, or otherwise ascertaining a first and second computing object that match the matching threshold. In embodiments, detecting can include analyzing a plurality of computing objects with respect to the matching threshold. In response to analyzing the plurality of computing objects, one or more computing objects may be determined to match within the matching threshold. In embodiments, computing objects that have trust scores within a specified range, share the same origin location, have similar volatility levels, or the same origination branch type may be determined to match the matching threshold. As an example, in certain embodiments, the matching threshold may be a trust score range of 60-70. Accordingly, a plurality of computing objects may be compared to the trust score range, and those computing objects that match within the trust score range may be detected for group deployment. For instance, among a plurality of computing objects having trust scores of 34, 12, 61, 98, and 68, the two computing objects having trust scores of 61 and 68 may be detected as matching the matching threshold (e.g., 61 and 68 fall within the specified range of 60-70). Other methods of detecting the first and second computing object that match the matching threshold are also possible.

In embodiments, a compute node to host the first and second computing objects may be identified at block 730. The compute node may be identified based on code origination data for each computing object. Generally, identifying can include selecting, discovering, recognizing, designating, or otherwise ascertaining a compute node to host the first and second computing objects. In embodiments, identifying the compute node may include ascertaining a host that is associated with positive impacts (e.g., data security, application performance, stability) with respect to the first and second computing objects. For instance, in a situation in which both the first and second computing objects are associated with relatively low trust scores, identifying the compute node may include selecting a compute node that does not host sensitive information or high-value client workloads (e.g., to limit data loss in the event of an error). As another example, in a situation in which both the first and second computing objects are associated with relatively high trust scores, identifying may include ascertaining a compute node that hosts a workload requiring stable, reliable software code. In embodiments, the first and second compute node may be deployed to the compute node at block 735. Generally, deploying can include placing, distributing, transferring, installing, allocating, or otherwise establishing the first and second computing objects on the same compute node. In embodiments, deploying may include configuring the first and second computing objects to operate on the compute node, and transferring assets pertaining to the first and second computing objects to the compute node. Other methods of identifying the compute node and deploying the first and second computing objects are also possible. The method 720 may conclude at block 739.

In embodiments, aspects of method 740 relate to placing computing objects having different trust factors on separate host compute nodes. In embodiments, aspects of the disclosure relate to the recognition that the nature of hosted workloads, security environment, data privacy requirements, or other properties of the compute nodes may influence the types of computing objects that may hosted. Accordingly, aspects of method 740 relate to separating differently trusted code for placement on different compute nodes. For instance, in certain embodiments, computing objects associated with relatively high trust scores may be placed on a first subset of compute nodes (e.g., nodes that host high-value workloads or sensitive information) while computing objects associated with relatively low trust scores may be placed on a second subset of compute nodes (e.g., nodes that do not host high-value workloads or sensitive information). Other methods of separating differently trusted computing objects for deployment on different computing nodes are also possible. The method 740 may begin at block 741.

In embodiments, a first and second computing object that mismatch a matching threshold (e.g., volatility measure threshold) may be detected at block 745. Generally, detecting can include monitoring, recognizing, discovering, discerning, or otherwise ascertaining a first and second computing object that mismatch the matching threshold. In embodiments, detecting can include analyzing a plurality of computing objects with respect to the matching threshold. In response to analyzing the plurality of computing objects, one or more computing objects may be determined to mismatch the matching threshold. In embodiments, computing objects that have trust scores outside a specified range, have different origination locations, different volatility levels, or different origination branch types may be determined to mismatch the matching threshold. As an example, in certain embodiments, the matching threshold may be a volatility measure threshold of between 60 and 100 changes per week. A plurality of computing objects having volatility measures of 47 changes per week, 61 changes per week, 70 changes per week, 94 changes per week, and 135 changes per week may be compared to the volatility measure threshold. Accordingly, the computing objects having volatility measures of 47 changes per week and 135 changes per week may be determined to mismatch the volatility measure threshold (e.g., 47 and 135 fall outside the volatility measure threshold of 60-100 changes a week.) Other methods of detecting the first and second computing object that mismatch the matching threshold are also possible.

In embodiments, first and second compute nodes to host the first and second computing objects may be identified at block 750. Generally, identifying can include selecting, discovering, recognizing, designating, or otherwise ascertaining a first compute node to host the first computing object and a second computing node to host the second computing object. In embodiments, identifying the first and second compute nodes may include ascertaining host computing nodes that are associated with positive impacts (e.g., data security, application performance, stability) with respect to the first and second computing objects. In certain embodiments, identifying the first and second computing nodes may be based on a comparison of the code origination data with the host profile data for a set of computing nodes. For instance, in embodiments, one or more compute nodes may have requirements or criteria that influence which computing objects they may host. As an example, a first compute node may be configured to only accept substantially stable computing objects that have volatility measures below 1% (e.g., 1% likelihood of encountering an error event upon execution). As another example, a second compute node may be configured to accept computing objects that have volatility measures between 1% and 2%. Accordingly, in embodiments, the first compute node may be identified to host a first computing object with a volatility measure of 0.4%, and the second compute node may be identified to host a second computing object with a volatility measure of 1.3% (e.g., the volatility measures for each computing object fall within the acceptable volatility measure thresholds for each corresponding compute node). In embodiments, the first computing object may be deployed to the first compute node and the second computing object may be deployed to the second node at block 755. Generally, deploying can include placing, distributing, transferring, installing, allocating, or otherwise establishing the first and second computing objects on separate compute nodes. Other methods of identifying the compute node and deploying the first and second computing objects are also possible. The method 740 may conclude at block 759.

In embodiments, aspects of method 760 relate to placing computing objects having different trust factors on the same compute node. Aspects of the disclosure relate to the recognition that, in certain embodiments, it may be desirable to allocate the computing objects so as to achieve a trust factor balance across the set of compute nodes. Accordingly, aspects of method 740 relate to deploying differently trusted code on the same compute node. For instance, in certain embodiments, computing objects may be allocated to compute nodes such that each compute node of the set of compute nodes hosts is associated with a similar overall trust score (averaged among the hosted computed objects). Other methods of deploying differently trusted code to the same compute node to achieve a trust-balanced placement arrangement are also possible. The method 760 may begin at block 761.

In embodiments, a first and second computing object that mismatch a matching threshold (e.g., trust threshold) may be detected at block 765. Generally, detecting can include monitoring, recognizing, discovering, discerning, or otherwise ascertaining a first and second computing object that mismatch the matching threshold. In embodiments, detecting can include analyzing a plurality of computing objects with respect to the matching threshold. In response to analyzing the plurality of computing objects, one or more computing objects may be determined to mismatch the matching threshold. In embodiments, computing objects that have trust scores outside a specified range, have different origination locations, different volatility levels, or different origination branch types may be determined to mismatch the matching threshold. As an example, in certain embodiments, the matching threshold may be a trust score range of 75-90. Accordingly, a plurality of computing objects having trust scores of 39, 84, 71, and 96 may be compared to the trust score range, and the two computing objects having trust scores of 39 and 96 may be detected for deployment to the same compute node (e.g., 39 and 96 do not fall within the trust score range of 75-90). Other methods of detecting the first and second computing object that mismatch the matching threshold are also possible.

In embodiments, a compute node to host the first and second computing objects may be identified at block 770. The compute node may be identified based on code origination data for each computing object. Generally, identifying can include selecting, discovering, recognizing, designating, or otherwise ascertaining a compute node to host both the first and second computing objects. Identifying the compute node may include ascertaining a host that is associated with positive impacts (e.g., data security, application performance, stability) with respect to the first and second computing objects. For instance, in certain embodiments, identifying the compute node may include placing the first and second computing objects on a compute node such that each compute node of the set of compute nodes has approximately the same trust score (e.g., averaged based on the individual trust scores of the computing objects it hosts). Consider the following example. A first computing object may have a trust score of 44, and a second computing object may have a trust score of 92. A set of compute nodes may include a first compute node having an average trust score of 53 and a second compute node having an average trust score of 38. In embodiments, it may be determined that placing the first and second computing objects together on the second compute node may result in a new average trust score of 53 for the second compute node, and achieve a trust-balanced configuration for the set of compute nodes. Accordingly, the second compute node may be identified to host the first and second computing objects. In embodiments, the first and second compute node may be deployed to the compute node at block 775. Generally, deploying can include placing, distributing, transferring, installing, allocating, or otherwise establishing the first and second computing objects on the same compute node. In embodiments, deploying may include configuring the first and second computing objects to operate on the compute node, and transferring assets pertaining to the first and second computing objects to the compute node. Other methods of identifying the compute node and deploying the first and second computing objects are also possible. The method 760 may conclude at block 779.

Figure 8:
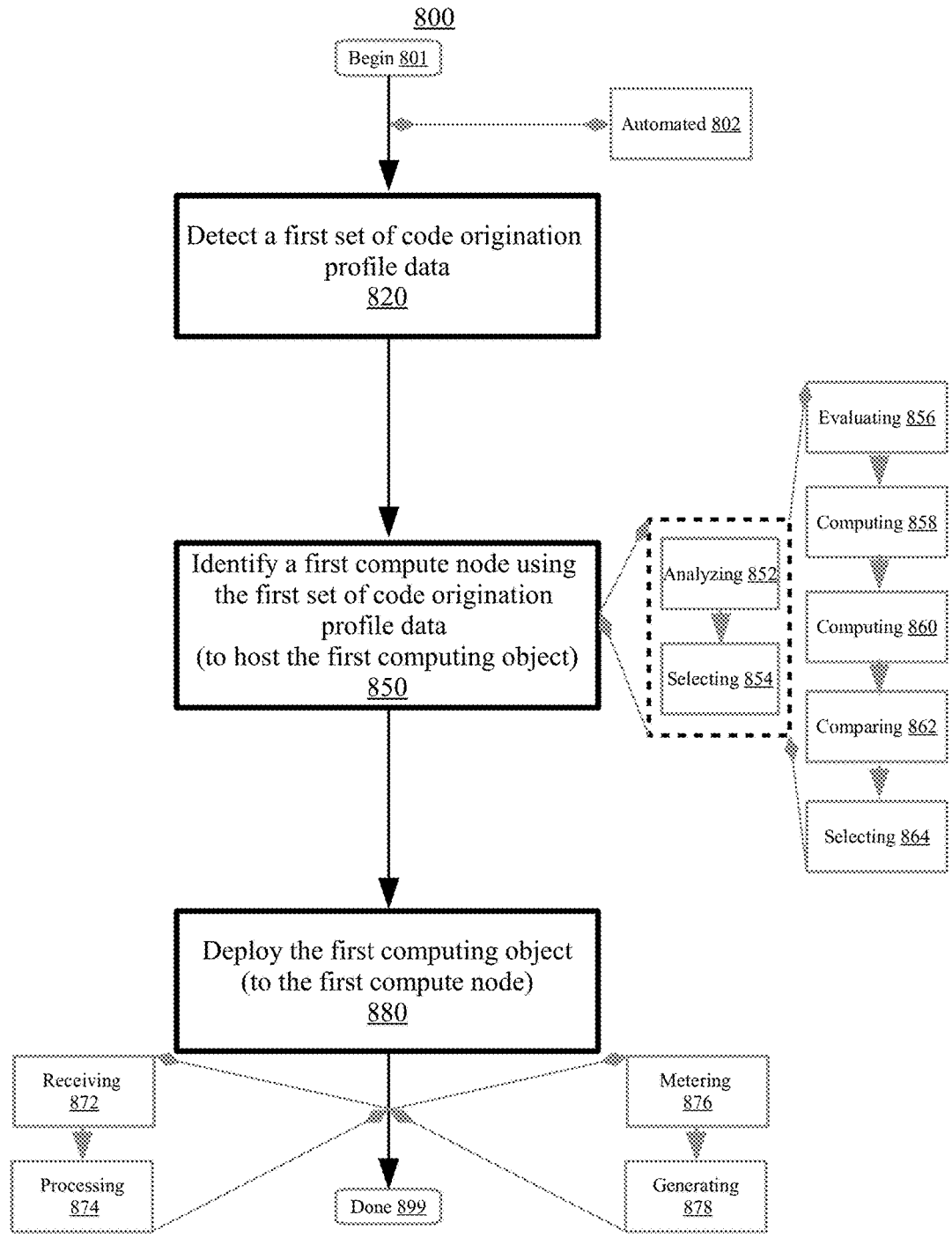
FIG. 8 is a flowchart illustrating a method for managing code origination data for a distributed computing environment having a set of compute nodes which include a first compute node, according to embodiments.

FIG. 8 is a flowchart illustrating a method 800 for managing code origination data for a distributed computing environment having a set of compute nodes which include a first compute node, according to embodiments. Aspects of FIG. 8 relate to selecting a host for a first computing object based on compatibility values for a set of compute nodes. In embodiments, aspects of FIG. 8 may substantially correspond to other embodiments described herein and FIGS. 1-10. At block 820, a first set of code origination data may be detected. At block 850, a first compute node to host the first computing object may be identified. In embodiments, a first set of code origination data for the first computing object may be analyzed at block 852. In embodiments, the first compute node to host the first computing object may be selected at block 854. At block 880, the first computing object may be deployed to the first compute node. The method 800 may begin at block 801.

In certain embodiments, the detecting, the identifying, the deploying and other steps described herein may each occur in an automated fashion without user intervention at block 802. In embodiments, the detecting, the identifying, the deploying, and other steps described herein may be carried out by an internal code origination data management module maintained in a persistent storage device of a computing node that also includes the corresponding computing object. In certain embodiments, the steps described herein may be carried out by an external origination data management module hosted by a remote computing device or server (e.g., accessible via a subscription, usage-based, or other service model).

In embodiments, the set of compute nodes may be evaluated to identify a set of candidate compute nodes at block 856. The set of candidate compute nodes may be identified based on the set of host profile data for the set of compute nodes. The set of candidate compute nodes may include both the first compute node and a second compute node. In embodiments, the set of candidate compute nodes may include those compute nodes of the set of compute nodes that fulfill the system resource, security, bandwidth, and other requirements of the first computing object, and are predicted to be associated with smooth operation and positive performance results with respect to the first computing object. Generally, evaluating can include analyzing, examining, inspecting, investigating, or otherwise assessing the set of compute nodes. In embodiments, evaluating may include examining the set of host profile data for the set of compute nodes and filtering out (e.g., removing) those compute nodes that are not a suitable match for the first computing object (e.g., insufficient hardware resources, unsatisfactory security protocols) in order to identify the set of candidate compute nodes. As an example, evaluating may include comparing the set of host profile data to a set of host requirements for the first computing object. Based on comparing, a subset of the set of compute nodes that has sufficient system resources to facilitate operation of the first computing object as well as security protocols that achieve the security requirements of the first computing object may be identified as the set of candidate compute nodes. Other methods of evaluating the set of compute nodes to identify the set of candidate compute nodes are also possible.

In embodiments, a first compatibility value may be computed for the first compute node at block 858, and a second compatibility value may be computed for the second compute node at block 860. The first and second compatibility values may be computed with respect to the first set of code origination data. Generally, computing can include calculating, formulating, deriving, ascertaining, or otherwise determining the first and second compatibility values. The first and second compatibility values may include integers, scores, numbers, ratings, or other measures represented by figures or symbols to express the relative degree of compatibility (e.g., suitability, reliability, consistency) of a compute node (e.g., candidate compute nodes) with respect to the computing objects. As described herein, the compatibility values may be computed based on the extent to which the host requirements of the computing objects (e.g., hardware requirements, security requirements) are achieved by the set of candidate compute nodes.

Consider the following example. A particular computing object may have a set of code origination data that indicates that it came from a "stable" origination branch, requires between 2.4 and 3.0 Gigahertz of processing resources, between 4 and 6 Gigabytes of memory, and between 12 and 16 Gigabytes of storage space. A first compute node of the set of candidate compute nodes may host a variety of computing objects having different levels of volatility, 2.6 Gigahertz of available processing resources, 3.5 Gigabytes of memory, and 14 Gigabytes of storage space. A second compute node of the set of candidate compute nodes may only host "stable" computing objects, have 2.7 Gigahertz of processing resources, 5 Gigabytes of memory, and 15 Gigabytes of storage space. Accordingly, the configuration of each compute node may be compared with the code origination data and host requirements of the computing object and weighted to calculate an index of the compatibility between the computing object and each compute node of the set of candidate compute nodes. For example, in embodiments, the first compute node may be assigned a compatibility value of 44, and the second compute node may be assigned a compatibility value of 75 (e.g., higher values indicate greater compatibility). Other methods of computing the first and second compatibility values are also possible.

In embodiments, the first and second compatibility values may be compared at block 862. Generally, comparing can include contrasting, correlating, juxtaposing, matching, evaluating, or otherwise examining the first and second compatibility values with respect to each other. In embodiments, comparing may include evaluating the magnitude of the first and second compatibility values with respect to each other. In certain embodiments, comparing may include separately modeling the predicted performance behavior that may result from placement of a particular computing object on the first and second compute nodes. For example, performance metrics including graphs and charts illustrating expected resource utilization and streaming application operations may be generated for theoretical placement configurations in which the computing object is placed on either the first or second compute nodes. Other methods of comparing the first and second compatibility values are also possible.

In embodiments, the first compute node may be selected at block 864. Generally, selecting can include choosing, designating, assigning, electing, or otherwise picking-out the first compute node to host the first computing object. In embodiments, selecting the first compute node may be based on the first compatibility value exceeding the second compatibility value. As an example, in a situation where a first compute node has a first compatibility value of 83 and a second compute node has a second compatibility value of 66, it may be determined that the first compatibility value exceeds the second compatibility value, and the first compute node may be selected (e.g., to host a computing object). Other methods of selecting the first compute node based on the first and second compatibility value are also possible.

At block 872, a stream of tuples is received. The stream of tuples may be processed by a plurality of processing elements (e.g., stream operators) operating on a set of compute nodes (e.g., in a distributed computing environment). The stream of tuples may be received consistent with the description herein including FIGS. 1-10. Current/future processing by the plurality of processing elements may be performed consistent with the description herein including FIGS. 1-10. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 874. The stream of tuples may be processed by the plurality of processing elements operating on the set of compute nodes. The stream of tuples may be processed consistent with the description herein including FIGS. 1-10. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of the set of code origination data may be metered at block 876. Metering the use of the warning data may include measuring, tracking, documenting, recording, or calculating the degree or extent of the utilization of the set of code origination data. The degree of utilization may be calculated based on the number of times the set of code origination data was accessed (e.g., 10 times, 100 times), the number of times the set of code origination data was attached to a computing object (e.g., compiled along with the computing object), resource usage (e.g., data processed by streaming applications that include the set of code origination data) or other means. Based on the metered use, an invoice may be generated at block 878. The invoice may include a bill, fee, service charge, or other itemized breakdown specifying compensation for the usage of the set of code origination data. Subscription based models are also possible. Method 800 may conclude at block 899.

Figure 9:
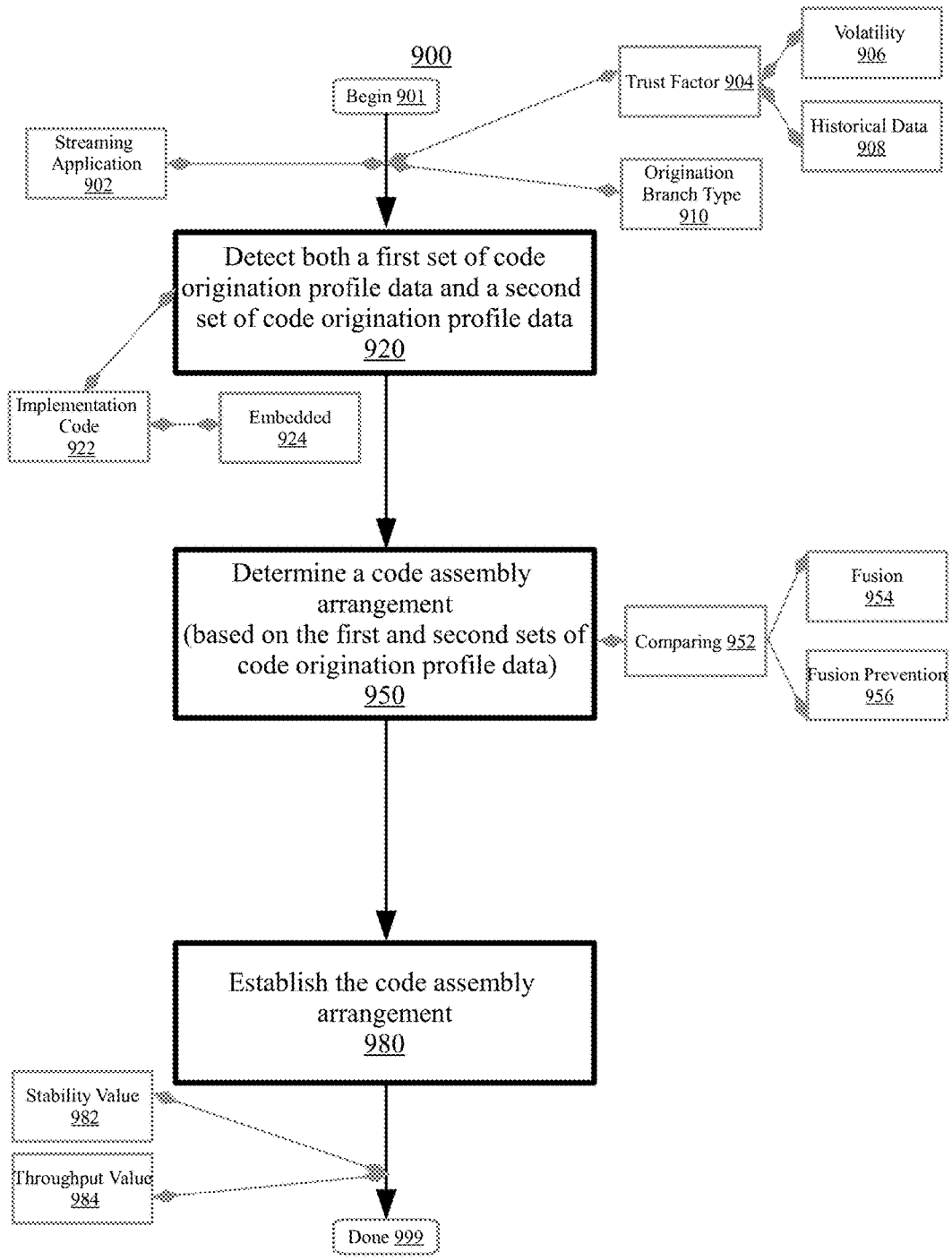
FIG. 9 is a flowchart illustrating a method for managing code origination data for a stream computing environment, according to embodiments.

FIG. 9 is a flowchart illustrating a method 900 for managing code origination data for a stream computing environment, according to embodiments. Aspects of FIG. 9 relate to determining and establishing a code assembly arrangement for a first and second computing object of the stream computing environment based on detected sets of code origination data for the computing objects. Generally, the set of code origination data can include information such as metadata or a digital signature that indicates or identifies a source (e.g., author, distributor) or origination location (e.g., in-house code development, third party code repository) of the first or second computing objects. The set of code origination data may be used to facilitate determination of a code assembly arrangement for the first and second computing objects. The code assembly arrangement can include a configuration of parameters, attributes, and protocols that defines one or more of the structure, composition, allocation, or behavior of the first and second computing objects in different usage contexts. Leveraging the set of code origination data may facilitate management of computing resources and be associated with performance or efficiency benefits (e.g., resource availability, network stability, computing resource efficiency) with respect to the stream computing environment. The method 900 may begin at block 901.

In embodiments, aspects of the disclosure relate to development of a distributed application including a streaming application at block 902. Generally, the streaming application can include a software program, digital package, executable file, or other set of computer instructions configured to process streams of data (e.g., tuples) in a distributed computing environment. Software components of the streaming application may be configured for dynamic delivery to one or more host compute nodes at the time a particular software component becomes necessary (e.g., rather than requiring the software components to be pre-installed on the host compute node). In embodiments, the streaming application may include one or more computing objects including a first computing object and a second computing object. The computing objects may include a set, portion, or line of implementation code, a code location, or other aspect of the implementation code that is included in the streaming application. For example, the computing objects may include streaming operators configured to perform one or more processes or operations with respect to a stream of tuples of the streaming application. Other types of streaming application and computing objects are also possible.

In embodiments, the first computing object may be associated with a first set of code origination data and the second computing object may be associated with a second set of code origination data. Generally, the first and second set of code origination data can include information that identifies the source (e.g., code developer, distributor) or origination location (e.g., in-house code development, third-party code repository), or indicates other characteristics or attributes regarding the history, origin, or development of the first computing object the first and second computing objects. In embodiments, the first set of code origination data may include metadata such as data tags, comments, or other annotations that indicate the individuals, organizations, or enterprises involved in the creation or development of the first or second computing objects. As an example, a particular computing object may be associated with a digital signature indicating that it was developed by the Junior Streams Engineering Team of TechLabs Software Corporation on Oct. 18, 2006. In embodiments, the first or second set of code origination data may include a history of the organizations that a particular computing object was handled by up to the present time. For instance, a computing object may be associated with a set of code origination data that indicates that it was created by the Junior Streams Engineering Team of TechLabs Software Corporation, certified as stable product code by the Techlabs Software Code Evaluation Committee, uploaded to a third-party code repository SoftwareHub, and then downloaded and modified by the Lakeville Programming Institute. Other types of code origination data are also possible.

In embodiments, the first set of code origination data may indicate a first trust factor for the first computing object and the second set of code origination data may indicate a second trust factor for the second computing object at block 904. Generally, the first and second trust factors can include a quantitative or qualitative measure, representation, expression, or indication of the reliability, safety, dependability, or security of the first or second computing objects. In embodiments, aspects of the disclosure relate to the recognition that the reliability or safety (e.g., trustworthiness) of a particular computing object may be based on the individual or organization that developed it. As such, an originator/source of a certain computing object can indicate (e.g., be mapped-to) a certain trust factor for the certain computing object. For instance, in-house developed computing objects may be considered more trustworthy than computing objects acquired from third-party software repositories. Accordingly, aspects of the disclosure relate to assigning trust factors to the first and second computing objects to indicate the security (e.g., level of encryption), safety (e.g., precautions against unauthorized access/compromise), credibility (e.g., expertise/proficiency of developer), or reliability (e.g., positive performance in usage instances) of the first and second computing objects. In embodiments, the first and second trust factors may be computed based on the code origination data, volatility (e.g., stability), or historical data (e.g., error reports, usage records) for the first or second computing objects. As described herein, in certain embodiments, a code assembly arrangement for the first and second computing objects may be determined and established based on the first and second trust factors. Other types of trust factors are also possible.

In embodiments, the first trust factor may be based on a first volatility of the first computing object and the second trust factor may be based on a second volatility of the second computing object at block 906. Generally, volatility can include an indication of the instability, unpredictability, or proclivity of a particular computing object to malfunction. In embodiments, volatile computing objects may be associated with a greater likelihood of failure, bugs, or other irregularities. In embodiments, volatility can include a measure of the frequency with which a particular computing object (e.g., the first or second computing object) changes. Changes to the first or second computing objects may be voluntary edits or revisions made to the source code by a developer or administrator, automatic changes made by another software application, or inadvertent changes caused as the result of a code defect or other error (e.g., poor cohesion, dependency structure, or abstraction).

In embodiments, the first and second volatilities of the first and second computing objects may be measured and expressed in a quantitative form (e.g., number of changes per time period). For instance, a software application that is undergoing development may be frequently revised and edited, resulting in a relatively high volatility measurement (e.g., 200 commit operations in a one day period). In embodiments, changes to a software application in the form of patches or updates may also be considered part of the volatility measurement for the first and second computing objects. As another example, a computing object that is associated with malfunctions in past usage instances (e.g., code frequency fails upon invocation) may also be associated with a relatively high volatility measurement. In embodiments, the volatility of the first computing object may be expressed as a percentage that indicates the likelihood of the first computing object encountering an error event or irregularity during execution (e.g., based on historical usage data). The greater the volatility measure for a particular computing object is, the more likely it is that changes to that software component will result in a code defect. Accordingly, as described herein, computing objects having low volatility may be associated with relatively high trust factors. Other methods of evaluating and utilizing volatility for the first and second computing objects are also possible.

In embodiments, the first set of code origination data may indicate a first origination branch of the first computing object and the second set of code origination data may indicate a second origination branch of the second computing object at block 910. Generally, the first and second origination branches may include an indication of the specific branch (e.g., segment or division of code) of the code repository that the first and second computing objects are associated with, respectfully. In embodiments, the first and second origination branches may be classified using one or more branch types that represent the stage of development of the first and second computing objects. For instance, in embodiments, the origination branch type may include a stable type, an unstable type, a testing type, an incubation type, a graduated type, an integrated type, a mature type, or a deprecated type. The stable type may indicate that the first or second computing object has low volatility (e.g., low frequency of errors/changes), low error event rates, and operates correctly. In embodiments, the unstable type may indicate that the first or second computing object has relatively high volatility (e.g., frequent errors/changes), frequent error events, doesn't operate correctly, or is associated with other issues or irregularities. The testing type may indicate that the first or second computing object is undergoing performance tests, evaluations, or other assessments, and may not be finalized. In embodiments, the incubation type may indicate that the first or second computing object is in an early stage of development, and remains substantially far from completion (e.g., unfinished source code, not compiled). The graduated type may indicate that the first or second computing object is in an intermediate stage of development, and that one or more significant operations remain before the first computing object is completed (e.g., not yet bug-tested, performance evaluations not performed). In embodiments, the integrated type may indicate that the first or second computing objects are incorporated along with other code, certain operators are called or referenced by other code modules, or that one or more aspects of the first or second computing objects are being utilized by external scripts or procedures. The mature type may indicate that the first or second computing object is substantially complete, has been utilized for an extended period of time (e.g., 6 months, 1 year), or has low volatility (e.g., low frequency of errors/changes). In embodiments, the deprecated type may indicate that the first or second computing object is associated with a bug/error, performance issue, or other irregularity. Other types of origination branch type beyond those described explicitly herein are also possible.

In embodiments, the first and second trust factors may be based on historical data for the first and second computing objects at block 908. Generally, historical data can include information regarding how, where, and in what way the first and second computing objects have been utilized in past software applications. For instance, the historical data may include performance history, usage records, test results, and other archived data regarding the usage history of the first or second computing objects. In embodiments, the historical data may include performance metrics indicating how the first or second computing object has performed in past software applications (e.g., number of times the first or second computing object was called/executed, whether or not errors were encountered), as well as the configuration information for the computing environment in which the first or second computing object was utilized (e.g., type of application, system resources allocated for use by the first or second computing object, workload handled by the first or second computing object). As an example, the historical data may indicate that a particular computing object has been utilized for 16 months in a streaming application hosted by a compute node having 4.6 Gigahertz of processing resources, 12 Gigabytes of memory, and 8 terabytes of storage space, and 3 error events were encountered during that time. Other types of historical data for the first and second computing objects are also possible.

In embodiments, as described herein, the first and second trust factors may be based on the origination data, volatility, and historical data for the first and second computing objects. In certain embodiments, the first and second trust factors may include a trust score calculated based on the origination data, volatility, and historical data for the first and second computing objects. The trust score may include a quantitative measure, grade, rank, representation, index, or other expression of the trust factor associated with either the first or second computing object. In embodiments, the trust score may be calculated using an algorithm, clustering technique, or other method configured to weight the origination data, volatility, and historical data to compute a quantitative indication of the trust factor for the first or second computing object. In embodiments, the trust score may be expressed as an integer between 0 and 100, where greater values are associated with higher levels of trust (e.g., reliability, credibility, dependability, safety, security) and lesser values are associated with lower levels of trust. In embodiments, the trust score may be expressed using a letter grading system (e.g., A, B, C, D, F). Other methods of determining and expressing the trust score are also possible.

Consider the following example. The first set of code origination data may indicate that the first computing object was developed by a team of experienced software engineers at a large company, is located in a "mature" type origination branch, has low volatility, and has been fused with other computing objects multiple times without encountering an error event (e.g., based on historical data). Accordingly, these factors may be weighted, and a trust score for the first computing object of "79" may be calculated (e.g., the first computing object is determined to be substantially safe, secure, reliable, or otherwise trustworthy). As another example, the second set of code origination data may indicate that the second computing object was developed by an unknown individual and downloaded from a third-party code repository. The second computing object may be located in a "incubation" type origination branch, have high volatility (e.g., frequent errors/changes), and have an unknown usage history. In embodiments, these factors may be weighted, and a trust score for the second computing object of "33" may be calculated. Other methods of calculating and assigning the trust score are also possible.

At block 920, both a first and second set of code origination data may be detected for utilization to develop a streaming application in the stream computing environment. The first set of code origination data may correspond to a first computing object and the second set of code origination data may correspond to a second computing object. Generally, detecting can include monitoring, recognizing, discerning, or otherwise discovering the first and second sets of code origination data. As described herein, the sets of code origination data can include information (e.g., metadata tags, digital signatures, comments) that identifies the source (e.g., code developer, distributor) or origination location (e.g., in-house code development, third-party code repository), or indicates other characteristics or attributes regarding the history, origin, or development of the first and second computing objects. In embodiments, detecting the first set of code origination data may include analyzing the first and second computing objects (e.g., portions of source code) and ascertaining that the first computing object is associated with the first set of code origination data and that the second computing object is associated with the second set of code origination data. For instance, in embodiments, detecting may include utilizing a code diagnostic tool (e.g., static code analyzer) to scan a source code file and identify a metadata tag that indicates the origin location (e.g., development organization) of a first computing object, and a digital signature that indicates the author of a second computing object included in the source code file. Other methods of detecting the first and second sets of code origination data are also possible.

Consider the following example. In embodiments, the first and second computing objects may include streaming operators. Both the first and second streaming operators may be associated with tags, annotations, or profile data that indicate the origination location (e.g., internal software development team of an organization, online code repository), usage history (e.g., length of operation, fusion history), and stability (e.g., number of error events encountered, code modification frequency) of each operator. As described herein, a code diagnostic tool may be used to parse the information associated with each streaming operator, and identify the tags, annotations, or profile data as the first or second set of code origination data. In embodiments, the first or second set of code origination data may include remarks such as "Stable Fusion Candidate," "Developed by High Tech Solutions San Jose In-house Senior Engineering Team," "Low Volatility," and "2nd year in service." Other methods of detecting the first or second set of code origination data are also possible.

In embodiments, the first computing object may include a first set of implementation code and the second computing object may include a second set of implementation code at block 922. Generally, the set of implementation code can include a collection of computer instructions that is configured to execute or carry out a particular computer command, function, or operation. As described herein, in embodiments, the set of implementation code may include source code for a streaming application. As examples, the set of implementation code may include stream operators for carrying out an operation in a streaming application, programming code for applications to provide media (e.g., video, music, images) delivery, data storage/backup, distributed computing resources, analytic services, and other computing services. In embodiments, the first set of code origination data may be embedded within the first set of implementation code and the second set of code origination data may be embedded within the second set of implementation code at block 924. Generally, embedding the first and second sets of origination data may include coupling, bundling, joining, correlating, linking, or otherwise establishing the first and second sets of origination data together with the first and second sets of implementation code. Embedding may include saving or maintaining the first and second sets of code origination data in association with the implementation code such that mutual data access, retrieval, modification, and other operations may be smoothly performed. In embodiments, as described herein, the first and second sets of code origination data may be compiled along with the first and second sets of implementation code as a single digital package. Other methods of embedding the first and second sets of code origination data with the first and second sets of implementation code are also possible.

At block 950, a code assembly arrangement with respect to the first and second computing objects may be determined. The code assembly arrangement may be determined based on the first and second sets of code origination data. Generally, determining can include resolving, formulating, identifying, or otherwise ascertaining the code assembly arrangement with respect to the first and second computing objects. As described herein, the code assembly arrangement can include a configuration of parameters, attributes, and protocols that defines one or more of the structure, composition, allocation, or behavior of the first and second computing objects in different usage contexts. In embodiments, the code assembly arrangement may include specified protocols for computing object fusion processes, exception handling, and computing object assignment/allocation (e.g., to a consistent region). Aspects of the disclosure relate to the recognition that the origin location data (e.g., and associated trust factor) for a particular computing object may impact how and where the computing object is utilized, as well as how it is allowed to interact with other pieces of code. Accordingly, in embodiments, determining may include analyzing the first and second sets of code origination data to ascertain a code assembly arrangement associated with positive impacts with respect to the first and second computing objects. As an example, determining the code assembly arrangement may include identifying that two computing objects have the same development location (e.g., ACME Software Corporation In-House Streaming Application Development Group), and thus may be candidates for fusion (e.g., computing objects with the same development location may be associated with error-free operation). Other methods of determining the code assembly arrangement for the first and second computing objects are also possible.

In embodiments, determining the code assembly arrangement with respect to the first and second computing objects may include comparing the first set of code origination data with the second set of code origination data at block 952. Generally, comparing can include contrasting, correlating, juxtaposing, matching, evaluating, or otherwise examining the first set of code origination data with respect to the second set of code origination data. Aspects of the disclosure, in embodiments, relate to comparing and contrasting the first and second sets of code origination data in order to ascertain an appropriate code assembly arrangement for the first and second computing objects. In embodiments, comparing may include examining the historical data (e.g., performance characteristics, usage records), volatility (e.g., stability, change frequency, error likelihood), origination location (e.g., developer), origination branch type (e.g., graduated type, mature type) and other information included in the first set of code origination data with respect to corresponding data from the second set of code origination data, and identifying one or more aspects that may impact the decision of whether or how to form a code assembly arrangement using the first and second computing objects. As an example, consider that the first and second sets of code origination data are compared, and it is identified that the first computing object has a relatively high volatility level (e.g., average of 160 changes per week), while the second computing object has a relatively low volatility level (e.g., average of 2-5 changes per week). Accordingly, the results of the comparison may be logged (e.g., in a database, index, directory) and used later on in the code assembly process. Other methods of comparing the first and second sets of code origination data are also possible.

In embodiments, it may be determined to fuse the first and second computing objects at block 954. Determining to fuse the first and second computing objects may be performed in response to the first and second sets of code origination data achieving a threshold similarity criterion. Generally, determining can include resolving, formulating, identifying, or otherwise ascertaining to fuse the first and second computing objects. As described herein, aspects of the disclosure relate to determining a code assembly arrangement for the first and second computing objects. In embodiments, operator fusion may represent one form of code assembly arrangement. Operator fusion may include the process of joining or combining a plurality of operators (e.g., streaming operators) together to form a single processing element. Operator fusion may be associated with benefits including code simplification, processing efficiency (e.g., reduced number of calls to a transport), and resource management. In embodiments, aspects of the disclosure relate to the recognition that it may be desirable to fuse computing objects that have similar origin locations, volatility levels, security standards or the like (e.g., fusion of similar computing operators may be associated with positive performance Accordingly, in embodiments, it may be determined to fuse the first and second computing objects into a single processing element. In embodiments, determining to fuse the first and second computing objects may be based on the first and second sets of code origination data achieving a threshold similarity criterion. The threshold similarity criterion may include a benchmark, stipulation, or requirement that specifies a necessary level of similarity (e.g., relevance, correspondence) for performing fusion. In embodiments, volatility, usage history, origination location, or one or more other factors may be used for the threshold similarity criterion. Consider, for example, that the first set of code origination data indicates that the first computing object was certified as stable product code by the Techlabs Software Code Evaluation Committee, belongs to a "mature" origination branch, and has low volatility, thus being associated with a relatively high trust score. The second set of code origination data may indicate that the second computing object was also certified as stable product code by the Techlabs Software Code Evaluation Committee, belongs to a "stable" origination branch, and has been used in products for 2 years with no notable errors, thus also having a relatively high trust score. As such, an evaluation of both the first and second sets of code origination data may indicate that, as both are certified by the same evaluation committee and have similar stability levels, that it is safe and reliable to fuse the first and second computing objects (e.g., both computing objects have high trust scores, leading to a high likelihood of good performance). Accordingly, it may be determined to fuse the first and second computing objects. As another example, in certain embodiments, it may be desirable to fuse multiple computing objects that are both associated with low trust scores (e.g., to minimize data loss in the event of an error). Other methods of determining to fuse the first and second computing objects are also possible.

In embodiments, it may be determined to prevent fusion of the first and second computing objects at block 956. Determining to prevent fusion of the first and second computing objects may be performed in response to the first and second sets of code origination data not achieving a threshold similarity criterion. Generally, determining can include resolving, identifying, or otherwise ascertaining to prevent fusion of the first and second computing objects. Aspects of the disclosure relate to the recognition that, in certain situations, fusion of particular computing objects (e.g., those with low trust scores) may lead to error events, instability, irregularities or other negatives outcomes. Accordingly, aspects of the disclosure relate to prohibiting, avoiding, blocking, or limiting fusion of the first and second computing objects in response to determining that the first and second sets of code origination data do not achieve a threshold similarity criterion. In certain embodiments, the threshold similarity criterion may make use of the trust factors of the first and second computing objects. As an example, the first set of code origination data may indicate that the first computing object was downloaded from a third-party code repository and has a high volatility (e.g., leading to a low trust score) while the second set of code origination data indicates that the second computing object was developed by the senior engineering team of a large software company and has been used in products for years (e.g., leading to a high trust score). As such, it may be determined that the first and second sets of code origination data do not achieve the threshold similarity criterion (e.g., trust scores differ by a threshold value), and that fusion may lead to instability or other undesirable outcomes. Accordingly, it may be determined to prevent fusion of the first and second computing objects. Other methods of determining to prevent fusion of the first and second computing objects are also possible.

At block 980, the code assembly arrangement may be established with respect to the first and second computing objects. The code assembly arrangement may be established to develop the streaming application. Generally, establishing can include performing, allocating, generating, executing, carrying-out, or configuring the code assembly arrangement for the first and second computing objects. In embodiments, establishing the code assembly arrangement may include implementing an action, initiating an operation, assigning a task, or configuring one or more parameters with respect to the first and second computing objects. As examples, in embodiments, establishing the code assembly arrangement may include fusing the first and second computing objects into a single processing element, allocating one or more of the first and second computing objects to a designated processing region of the streaming application (e.g., consistent region), or defining specific behavior for either the first or second computing objects (e.g., exception handling). Other methods of establishing the code assembly arrangement with respect to the first and second computing objects are also possible.

Consider the following example. A streaming application may be in development by the Online Banking Management Team at 25th National Bank. A first set of code origination data for a first computing object may be detected. The first set of code origination data may indicate that the first computing object was developed in-house by the 25th National Bank Online Banking Management Team, has a volatility measure of 0.5%, and has been used in online banking applications without incident for 16 months. A second set of code origination data for a second computing object may be detected. The second set of code origination data may indicate that the second computing object was acquired from a third-party code repository, and has unknown performance characteristics and an unknown development location. In embodiments, a third set of code origination data for a third computing object may indicate that the third computing object was downloaded from a third-party code repository but has an identified developer of "Bank Assist Corporation," and has been used in software applications by 25th National Bank for 3 years with no error events. Accordingly, the first, second, and third sets of code origination data may all be compared to each other, and it may be ascertained that the second computing object may be associated with security concerns (e.g., unverified performance characteristics and developer) and deemed unfit for fusion. In embodiments, the first and third computing objects may be ascertained to be safe for inclusion in a code assembly arrangement. As such, in embodiments, the code assembly arrangement may be established by fusing the first and third computing objects into a single processing element.

In embodiments, the code assembly arrangement may have an assembled stability value at block 982. Generally, the assembled stability value can include a quantitative measure (e.g., integer) that expresses the relative reliability, consistency, or dependability of the code assembly arrangement. Aspects of the disclosure, in embodiments, relate to establishing a code assembly arrangement that positively impacts the stability of the first and second computing objects. Accordingly, in embodiments, the assembled stability value associated with the code assembly arrangement may exceed a disassembled stability value for an alternative to the code assembly arrangement. The disassembled stability value for an alternative to the code assembly arrangement may include a quantitative measure of the reliability, consistency, or dependability of a different configuration for the first and second computing objects that does not involve code assembly (e.g., the default configuration of the first and second computing objects prior to code assembly).

Consider the following example. Based on the volatility and usage history of the first and second computing objects, a disassembled stability value of 54 as well as a predicted assembled stability value of 65 for a candidate code assembly arrangement may be computed. The disassembled stability value of 54 may be compared to the assembled stability value of 65, and it may be determined to establish the code assembly arrangement in response to ascertaining that the predicted assembled stability value for the code assembly arrangement exceeds the disassembled stability value (e.g., establishing the code assembly arrangement is predicted to have positive impacts with respect to the stability of the first and second computing objects as compared to other configurations). Other types of and uses for the assembled stability value are also possible.

In embodiments, the code assembly arrangement may have an assembled throughput value at block 984. Generally, the assembled throughput value can include a quantitative measure of the amount of data processed by the code assembly arrangement in a particular time period (e.g., throughput rate). In embodiments, the assembled throughput value may be expressed in tuples per second (e.g., 200 tuples per second). Aspects of the disclosure, in embodiments, relate to establishing a code assembly arrangement that positively impacts the throughput rate of the first and second computing objects. Accordingly, in embodiments, the assembled throughput value may exceed a disassembled throughput value for an alternative to the code assembly arrangement. The disassembled throughput value for an alternative to the code assembly arrangement may include a quantitative measure of the amount of data processed in a particular time period by a different configuration for the first and second computing objects that does not involve code assembly (e.g., the throughput rates of the first and second computing objects individually, prior to code assembly).

Consider the following example. Performance evaluation testing of the first and second computing objects may be performed, and it may be determined that the first computing object has a throughput rate of 64 tuples per second and the second computing object has a throughput rate of 72 tuples a second, resulting in an average disassembled throughput value of 68 tupes per second for the disassembled configuration of the first and second computing objects. A simulation may be generated to compute an expected throughput value for a particular code assembly arrangement (e.g., fusion) using the first and second computing objects, and an assembled throughput value of 86 tuples per second may be calculated. Accordingly, the disassembled throughput value of 68 may be compared with the assembled throughput value of 86, and it may be determined to establish the code assembly arrangement in response to ascertaining that the expected assembled throughput value for the code assembly arrangement exceeds the disassembled throughput value (e.g., establishing the code assembly arrangement is predicted to have positive impacts with respect to the throughput of the first and second computing objects as compared to other configurations). Other types of and uses for the assembled throughput value are also possible.

Method 900 concludes at block 999. Aspects of method 900 may provide performance or efficiency benefits for code origination data management. For example, aspects of method 900 may have positive impacts with respect to code assembly arrangement determination and distributed application development in a stream computing environment. In embodiments, the detecting, determining, and establishing described herein may each occur in an automated fashion without user intervention. Altogether, leveraging the set of code origination data may facilitate management of computing resources and be associated with performance or efficiency benefits (e.g., resource availability, network stability, computing resource efficiency) with respect to the stream computing environment.

Figure 10:
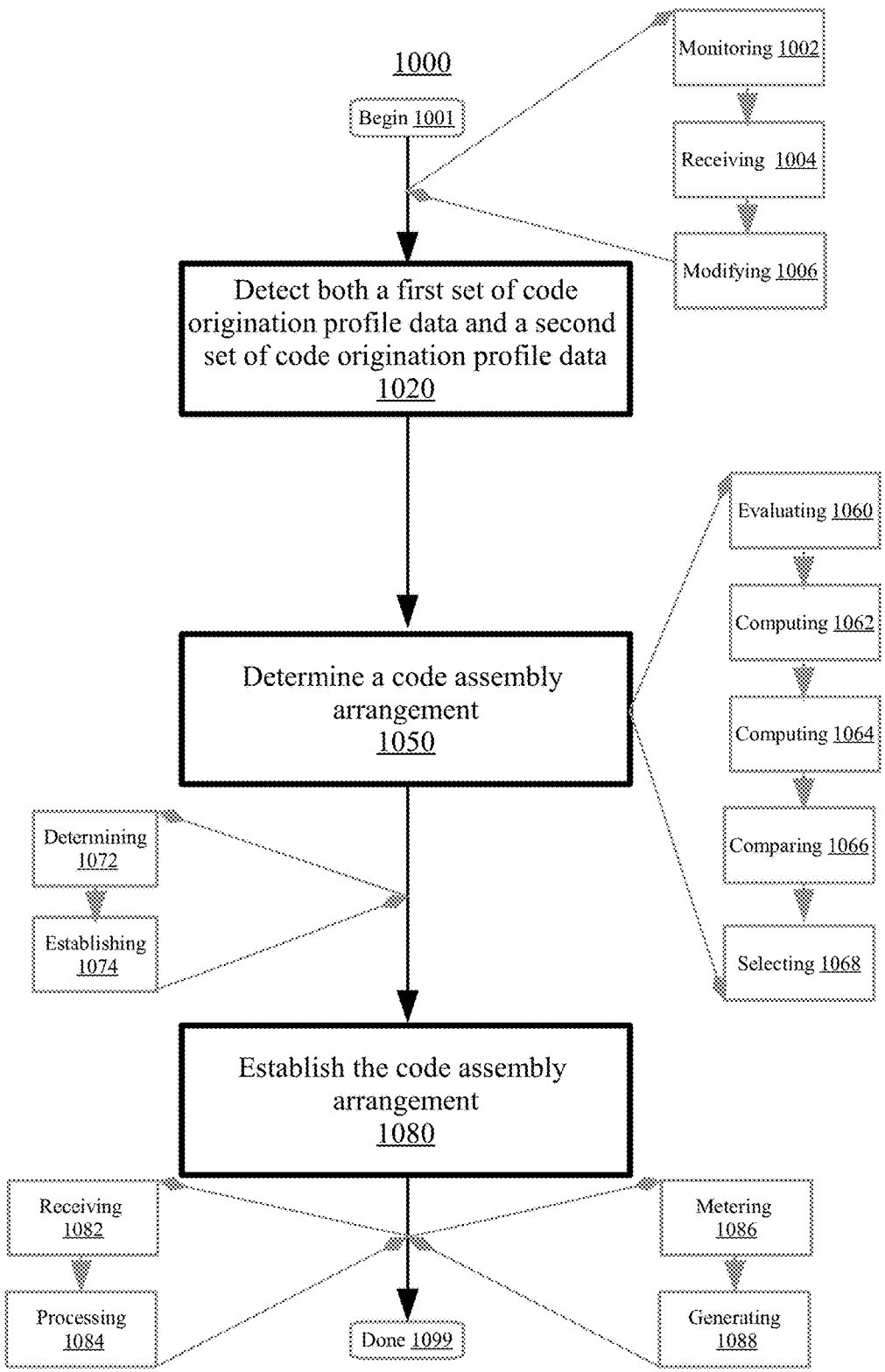
FIG. 10 is a flowchart illustrating a method for managing code origination data for a stream computing network, according to embodiments.

FIG. 10 is a flowchart illustrating a method 1000 for managing code origination data for a stream computing network, according to embodiments. Aspects of FIG. 10 relate to determination of a code assembly arrangement (e.g., exception handling, consistent region allocation) for a first and second computing object of the stream computing environment. In embodiments, aspects of FIG. 10 may substantially correspond to other embodiments described herein and FIGS. 1-10. At block 1020, both a first and second set of code origination data may be detected. At block 1050, a code assembly arrangement with respect to the first and second computing objects may be determined based on the first and second sets of code origination data. At block 1080, the code assembly arrangement may be established. Leveraging the set of code origination data may facilitate management of computing resources and be associated with performance or efficiency benefits (e.g., resource availability, network stability, computing resource efficiency) with respect to the stream computing environment. The method 1000 may begin at block 1001.

In embodiments, a particular set of code origination data which corresponds to a particular computing object may be monitored for at block 1002. The monitoring may be performed using an exception handling operator. The exception handling operator may be a processing element configured to respond to the occurrence of exceptions (e.g., anomalous or exceptional conditions requiring special processing) during program execution (e.g., of a computing object or code assembly arrangement). Generally, monitoring can include recognizing, scanning, overseeing, watching, or discovering the particular set of code origination data. Aspects of the disclosure, relate to the recognition that certain computing objects may be may be handled differently based associated code origination data. Accordingly, in embodiments, aspects of the disclosure relate to using an exception handler to monitor for particular sets of code origination data that indicate the presence of computing objects that should be handled according to a special protocol. In embodiments, monitoring can include configuring the exception handler to scan a set of computing objects and detect those computing objects that are associated with pre-determined pieces of code origination data. As examples, the exception handler may be configured to monitor for those computing objects that were developed by a specific individual or organization (e.g., "John Smith" or "ACME Computer Solutions"), have a certain volatility (e.g., 60 changes per day, 11%), or have a particular length of service in products (e.g., 10 months). In embodiments, the exception handling operator may be configured to facilitate performance of updates (e.g., patches, firmware updates) with respect to particular computing objects (e.g., monitoring for updates to particular computing objects). Other methods of monitoring for a particular set of code origination data which corresponds to a particular computing object are also possible.

In embodiments, the particular set of code origination data which corresponds to the particular computing object may be received at block 1004. The particular set of code origination data may be received by the exception handling operator. Generally, receiving can include detecting, collecting, acquiring, identifying, or accepting delivery of one or more particular sets of code origination data. In embodiments, receiving may include identifying that a particular computing object is associated with the particular set of code origination data, and collecting the computing object (e.g., for later processing). As an example, the exception handler may be configured to monitor for computing objects that were downloaded from web-based code repositories (e.g., as indicated by associated code origination data). In response to detecting that a particular computing object has origination data stating that it was downloaded from the code repository "SoftwareHub," the exception handler may be configured to log the computing object in a database, and maintain the computing object in a hold queue for later processing. Other methods of receiving the particular computing object are also possible.

In embodiments, the code assembly arrangement using the particular computing object may be modified at block 1006. The code assembly arrangement may be modified in response to receiving the particular set of code origination data. Generally, modifying can include altering, revising, adjusting, repairing, or otherwise changing the code assembly arrangement. As described herein, aspects of the disclosure relate to using the exception handling operator to identify a particular computing object as the target of special handling. Accordingly, in embodiments, modifying can include reconfiguring the code assembly arrangement of the particular computing object in response to determining that it is associated with the particular set of code origination data. For instance, modifying may include selecting the particular computing object as a candidate for fusion. Consider the following example. In response to monitoring for and receiving a particular computing object that was downloaded from a code repository, the exception handling operator may be configured to initiate fusion between the particular computing object and another computing object that was downloaded from a code repository (e.g., it may be desirable to fuse objects of unknown source together to limit the extent of data loss in case of an error event). Other methods of modifying the code assembly arrangement of the particular computing object are also possible.

In embodiments, determining the code assembly arrangement may include evaluating the first and second computing objects to identify a set of candidate code assembly arrangements at block 1060. The first and second code computing objects may be evaluated based on the first and second sets of code origination data. The set of candidate code assembly arrangements may include both the code assembly arrangement and an alternative code assembly arrangement. In embodiments, the set of candidate code assembly arrangements may include potential code assembly arrangements that achieve the system resource, security, bandwidth, and other requirements of both the first and second computing objects, and are expected to be associated with smooth operation and positive performance results. Generally, evaluating can include analyzing, examining, inspecting, investigating, or otherwise assessing the first and second computing objects. In embodiments, evaluating may include examining the first and second sets of code profile data by generating one or more performance simulations for the potential code assembly arrangements, and eliminating those code assembly arrangements that are associated with unstable performance, error results, data security issues, or other irregularities. Accordingly, the remaining code assembly arrangements (e.g., those associated with stable performance, few errors, data security, and other positive impacts) may be identified as the set of candidate code assembly arrangements (e.g., including the code assembly arrangement and an alternative code assembly arrangement). Other methods of evaluating the first and second computing objects to identify the set of candidate code assembly arrangements are also possible.

In embodiments, a first performance value with respect to the code assembly arrangement may be computed at block 1062, and a second performance value with respect to the alternative code assembly arrangement may be computed at block 1064. Generally, computing can include calculating, formulating, deriving, ascertaining, or otherwise determining the first and second performance values. The first and second performance values may include integers, scores, ratings, numbers, or other quantitative measures to express the stability, security, or overall quality of the performance exhibited by the code assembly arrangement and the alternative code assembly arrangement. In embodiments, the first and second performance values may be calculated by a computation technique or algorithm configured to weight the stability, speed, output, data security, and reliability for both the code assembly arrangement and the alternative code assembly arrangement. In embodiments, the first performance value may be calculated based on the assembled stability value and the assembled throughput value for the code assembly arrangement, and the second performance value may be calculated based on the disassembled stability value and disassembled throughput value for an alternative to the code assembly arrangement (e.g., unassembled state, alternative code assembly arrangement). For example, for a code assembly arrangement having an assembled stability value of 57 and an assembled throughput value of 63, a first performance value of 60 may be computed (e.g., the numerical average of the assembled stability value and the assembled throughput value). Other methods of computing the first and second performance values are also possible.

In embodiments, the first and second performance values may be compared at block 1066. Generally, comparing can include contrasting, correlating, juxtaposing, matching, evaluating, or otherwise examining the first and second performance values with respect to each other. In embodiments, comparing may include evaluating the magnitude of the first and second performance values with respect to each other. As an example, consider a situation in which the code assembly arrangement is associated with a first performance value of 55 and the alternative code assembly arrangement is associated with a second performance value of 41. The magnitudes of the first and second performance values may be compared, and it may be determined that the first performance value exceeds the second performance value. Based on the first performance value exceeding the second performance value, the code assembly arrangement may be selected at block 1068. Generally, selecting can include choosing, designating, assigning, electing, or otherwise picking-out the code assembly arrangement for the first and second computing objects. As described herein, selecting the code assembly arrangement may be based on the first compatibility value exceeding the second compatibility value. Referring to the example above, in response to determining that the first performance value of 55 exceeds the second performance value of 41, the code assembly arrangement may be selected (e.g., the higher performance value indicates better performance for the first and second computing objects using the code assembly arrangement as compared to the alternative code assembly arrangement). Other methods of selecting the code assembly arrangement based on the first and second compatibility value are also possible.

In embodiments, it may be determined to utilize a consistent region for the code assembly arrangement with respect to the first and second computing objects at block 1072. Determining to utilize the consistent region for the code assembly arrangement may be determined based on the first and second sets of code origination data. Generally, determining can include resolving, selecting, deciding, or otherwise ascertaining to utilize the consistent region for the code assembly arrangement. The consistent region can include a sub-graph (e.g, area, portion) of the stream computing environment configured to reduce data loss as a result of software errors events and hardware failure. Accordingly, in certain embodiments, aspects of the disclosure relate to determining to make use of a consistent region with respect to code assembly arrangements that are associated with a higher risk of encountering errors events or other irregularities. For instance, in embodiments, computing objects that are considered volatile, unstable, or not sufficiently trustworthy (e.g., trust score below a threshold) may be determined to be utilized in conjunction with a consistent region. As an example, the first and second sets of code origination data for a code assembly arrangement may be analyzed, and it may be determined that the code assembly arrangement has a volatility measure above a threshold value, is associated with an origination branch that indicates instability (e.g., unstable, incubation, deprecated), has a trust score below a threshold value, or has another indication that it may be associated with error events or instability. Accordingly, it may be determined to utilize a consistent region with respect to the code assembly arrangement (e.g., to reduce data loss in the event of an error). Other methods of determining to use the consistent region are also possible.

In embodiments, the code assembly arrangement with respect to the first and second computing objects may be established in the consistent region at block 1074. Generally, establishing can include placing, configuring, assigning, designating, or allocating the code assembly arrangement to the consistent region. In embodiments, establishing may include ascertaining a location in the consistent region for placement of the code assembly arrangement, and configuring both the code assembly arrangement as well as other streaming operators of the consistent region to facilitate operation stable operation of the code assembly arrangement. As an example, consider that the code assembly arrangement includes two computing objects that have been fused together into a single processing element. The first and second sets of code origination data for the code assembly arrangement may indicate that both the first and second computing objects were developed by an organization called "Techlabs Software." Historical usage data may indicate that, in the past, "Techlabs Software" developed computing objects have often become unstable handling throughputs greater than 140 tuples per second. Accordingly, the code assembly arrangement may be placed in the consistent region and configured so as to avoid receiving data streams at a throughput rate greater than 140 tuples per second. Other methods of establishing the code assembly arrangement in the consistent region are also possible.

At block 1082, a stream of tuples is received. The stream of tuples may be processed by a plurality of processing elements (e.g., stream operators) operating on a set of compute nodes (e.g., in a stream computing environment). The stream of tuples may be received consistent with the description herein including FIGS. 1-10. Current/future processing by the plurality of processing elements may be performed consistent with the description herein including FIGS. 1-10. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 1084. The stream of tuples may be processed by the plurality of processing elements operating on the set of compute nodes. The stream of tuples may be processed consistent with the description herein including FIGS. 1-10. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

In embodiments, use of the set of code origination data or the code assembly arrangement may be metered at block 1086. Metering the use of the set of code origination data or the code assembly arrangement may include measuring, tracking, documenting, recording, or calculating the degree or extent of the utilization of either the set of code origination data or the code assembly arrangement. The degree of utilization may be calculated based on the number of times the set of code origination data or code assembly arrangement were accessed (e.g., 10 times, 100 times), the number of times the set of code origination data or was used to determine a code assembly arrangement for the first and second computing objects, resource usage (e.g., data processed by streaming applications that include the set of code origination data) or other means. Based on the metered use, an invoice may be generated at block 1088. The invoice may include a bill, fee, service charge, or other itemized breakdown specifying compensation for the usage of the set of code origination data or the code assembly arrangement. Subscription based models are also possible. Method 1000 may conclude at block 1099.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of managing code origination data for a stream computing environment, the method comprising:
   detecting, for utilization to develop a streaming application in the stream computing environment, both a first set of code origination data which corresponds to a first computing object and a second set of code origination data which corresponds to a second computing object;
   determining, based on the first and second sets of code origination data, a code assembly arrangement with respect to the first and second computing objects;
   establishing, to develop the streaming application, the code assembly arrangement with respect to the first and second computing objects;
   monitoring, using an exception handling operator, for a particular set of code origination data which corresponds to a particular computing object;
   receiving, by the exception handling operator, the particular set of code origination data which corresponds to the particular computing object; and
   modifying, in response to receiving the particular set of code origination data, the code assembly arrangement using the particular computing object.

2. The method of claim 1, wherein the first set of code origination data indicates a first trust factor for the first computing object, and wherein the second set of code origination data indicates a second trust factor for the second computing object.

3. The method of claim 2, wherein the first trust factor is based on a first volatility of the first computing object, and wherein the second trust factor is based on a second volatility of the second computing object.

4. The method of claim 2, wherein the first trust factor is based on a first origination branch of the first computing object, a first volatility of the first computing object, and a first set of historical data pertaining to the first computing object, and wherein the second trust factor is based on a second origination branch of the second computing object, a second volatility of the second computing object, and a second set of historical data pertaining to the second computing object.

5. The method of claim 1, wherein the first set of code origination data indicates a first origination branch of the first computing object, wherein the second set of code origination data indicates a second origination branch of the second computing object, and wherein the first and second origination branches have one or more types selected from a group consisting of: a stable type, an unstable type, a testing type, an incubation type, a graduated type, an integrated type, a mature type, and a deprecated type.

6. The method of claim 1, wherein determining, based on the first and second sets of code origination data, the code assembly arrangement with respect to the first and second computing objects includes:
comparing the first set of code origination data with the second set of code origination data.

7. The method of claim 6, further comprising:
determining, in response to the first and second sets of code origination data achieving a threshold similarity criterion, to fuse the first and second computing objects.

8. The method of claim 6, further comprising:
determining, in response to the first and second sets of code origination data not achieving a threshold similarity criterion, to prevent fusion of the first and second computing objects.

9. The method of claim 1, further comprising:
determining, based on the first and second sets of code origination data, to utilize a consistent region for the code assembly arrangement with respect to the first and second computing objects; and
establishing, in the consistent region, the code assembly arrangement with respect to the first and second computing objects.

10. The method of claim 1, wherein the first computing object includes a first set of implementation code having the first set of code origination data embedded therein, and wherein the second computing object includes a second set of implementation code having the second set of code origination data embedded therein.

11. The method of claim 1, wherein the code assembly arrangement has an assembled stability value which exceeds a disassembled stability value for an alternative to the code assembly arrangement.

12. The method of claim 1, wherein the code assembly arrangement has an assembled throughput value which exceeds a disassembled throughput value for an alternative to the code assembly arrangement.

13. The method of claim 1, wherein determining, based on the first and second sets of code origination data, the code assembly arrangement with respect to the first and second computing objects includes:
evaluating, based on the first and second sets of code origination data, the first and second computing objects to identify a set of candidate code assembly arrangements including both the code assembly arrangement and an alternative code assembly arrangement;
computing, with respect to the code assembly arrangement, a first performance value for the code assembly arrangement;
computing, with respect to the alternative code assembly arrangement, a second performance value for the alternative code assembly arrangement;
comparing the first and second performance values; and
selecting, based on the first performance value exceeding the second performance value, the code assembly arrangement.

14. The method of claim 1, wherein the detecting, the determining, and the establishing each occur in an automated fashion without user intervention.

15. The method of claim 1, further comprising:
receiving a stream of tuples to be processed by a set of processing elements which operate on a set of compute nodes having the code assembly arrangement; and
processing, using the set of processing elements operating on the set of compute nodes having the code assembly arrangement, the stream of tuples.

16. The method of claim 1, further comprising:
metering use of the code assembly arrangement; and
generating an invoice based on the metered use.

17. A system of managing code origination data for a stream computing environment, the system comprising:
a memory having a set of computer readable computer instructions, and
a processor for executing the set of computer readable instructions, the set of computer readable instructions including:
detecting, for utilization to develop a streaming application in the stream computing environment, both a first set of code origination data which corresponds to a first computing object and a second set of code origination data which corresponds to a second computing object;
determining, based on the first and second sets of code origination data, a code assembly arrangement with respect to the first and second computing objects; and
establishing, to develop the streaming application, the code assembly arrangement with respect to the first and second computing objects;
monitoring, using an exception handling operator, for a particular set of code origination data which corresponds to a particular computing object;
receiving, by the exception handling operator, the particular set of code origination data which corresponds to the particular computing object; and
modifying, in response to receiving the particular set of code origination data, the code assembly arrangement using the particular computing object.

18. A computer program product of managing code origination data for a stream computing environment, the computer program product comprising a computer readable storage medium having program instructions embodied therewith, wherein the computer readable storage medium is not a transitory signal per se, the program instructions executable by a processor to cause the processor to perform a method comprising:
detecting, for utilization to develop a streaming application in the stream computing environment, both a first set of code origination data which corresponds to a first computing object and a second set of code origination data which corresponds to a second computing object;
determining, based on the first and second sets of code origination data, a code assembly arrangement with respect to the first and second computing objects;
establishing, to develop the streaming application, the code assembly arrangement with respect to the first and second computing objects;
monitoring, using an exception handling operator, for a particular set of code origination data which corresponds to a particular computing object;
receiving, by the exception handling operator, the particular set of code origination data which corresponds to the particular computing object; and
modifying, in response to receiving the particular set of code origination data, the code assembly arrangement using the particular computing object.

19. The computer program product of claim 18, wherein at least one of:
the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to the remote data processing system for use in a second computer readable storage medium with the remote data processing system.

* * * * *